(12) United States Patent
Rezzi et al.

(10) Patent No.: US 12,556,094 B2
(45) Date of Patent: Feb. 17, 2026

(54) STATE MACHINE BASED DC/DC CONVERTER

(71) Applicants: INVENTVM Semiconductor SRL, Pavia (IT); Silicon Mitus Inc., Bundang-Gu (KR)

(72) Inventors: Francesco Rezzi, Montebello della Battaglia (IT); Alessandro Pesucci, Bereguardo (IT); Flavio Avanzo, Certosa di Pavia (IT); Andrea Lombardi, Pavia (IT)

(73) Assignees: INVENTVM Semiconductor SRL, Pavia (IT); Silicon Mitus. Inc., Daewangpangyo-Ro (KR)

( * ) Notice: Subject to any disclaimer, the term of this patent is extended or adjusted under 35 U.S.C. 154(b) by 476 days.

(21) Appl. No.: 18/156,325

(22) Filed: Jan. 18, 2023

(65) Prior Publication Data
US 2024/0178758 A1 May 30, 2024

(30) Foreign Application Priority Data
Nov. 30, 2022 (EP) ..................... 22210473

(51) Int. Cl.
*H02M 3/158* (2006.01)
*H02M 1/00* (2007.01)
(52) U.S. Cl.
CPC ....... *H02M 3/1582* (2013.01); *H02M 1/0003* (2021.05); *H02M 1/0025* (2021.05)
(58) Field of Classification Search
CPC . H02M 1/0003; H02M 1/0025; H02M 3/1582
See application file for complete search history.

(56) References Cited

U.S. PATENT DOCUMENTS

| 7,768,245 B1 | 8/2010 | De Cremoux |
| 2015/0229215 A1 | 8/2015 | Choudhary |
| 2016/0164411 A1* | 6/2016 | Chen .................. H02M 3/1582 323/271 |

(Continued)

FOREIGN PATENT DOCUMENTS

KR    20220132773    10/2022

OTHER PUBLICATIONS

Linear Technology Corporation, LTC3440 Micropower Synchronous Buck-Boost DC/DC Converter (circa 2001) (22 pages).

(Continued)

*Primary Examiner* — Jue Zhang
(74) *Attorney, Agent, or Firm* — Cook Alex Ltd.

(57) ABSTRACT

A buck-boost converter includes a converter, for converting an input voltage into an output voltage, the converter including a plurality of switches and an inductor, and a controller for controlling the plurality of switches. The operation of the controller is driven by a finite state machine configured to receive as input state change signals and to provide as output state signals for driving the controller. The state change signals are generated by a comparator based on a comparison of a replica signal and an error signal, wherein the error signal is computed on the basis of a signal representative of a difference between a characteristic of the converter and a predetermined reference signal, and wherein the replica signal is representative of the current flowing through the inductor.

18 Claims, 13 Drawing Sheets

(56) References Cited

U.S. PATENT DOCUMENTS

| | | |
|---|---|---|
| 2019/0181757 A1 | 6/2019 | Sharma |
| 2019/0305666 A1 | 10/2019 | Yang et al. |
| 2020/0373841 A1 | 11/2020 | Xie et al. |
| 2022/0069708 A1 | 3/2022 | Karri et al. |

OTHER PUBLICATIONS

Renesas Electronics Corporation, Renesas ISL9238 Buck-Boost Narrow VDC Battery Charger with SMBus Interface and USB OTG, Datasheet (May 31, 2018) (46 pages).

Extended European Search Report, counterpart European Patent App. No. 22210473 (Apr. 28, 2023) (8 pages).

\* cited by examiner

*Fig. 4A - Buck mode*
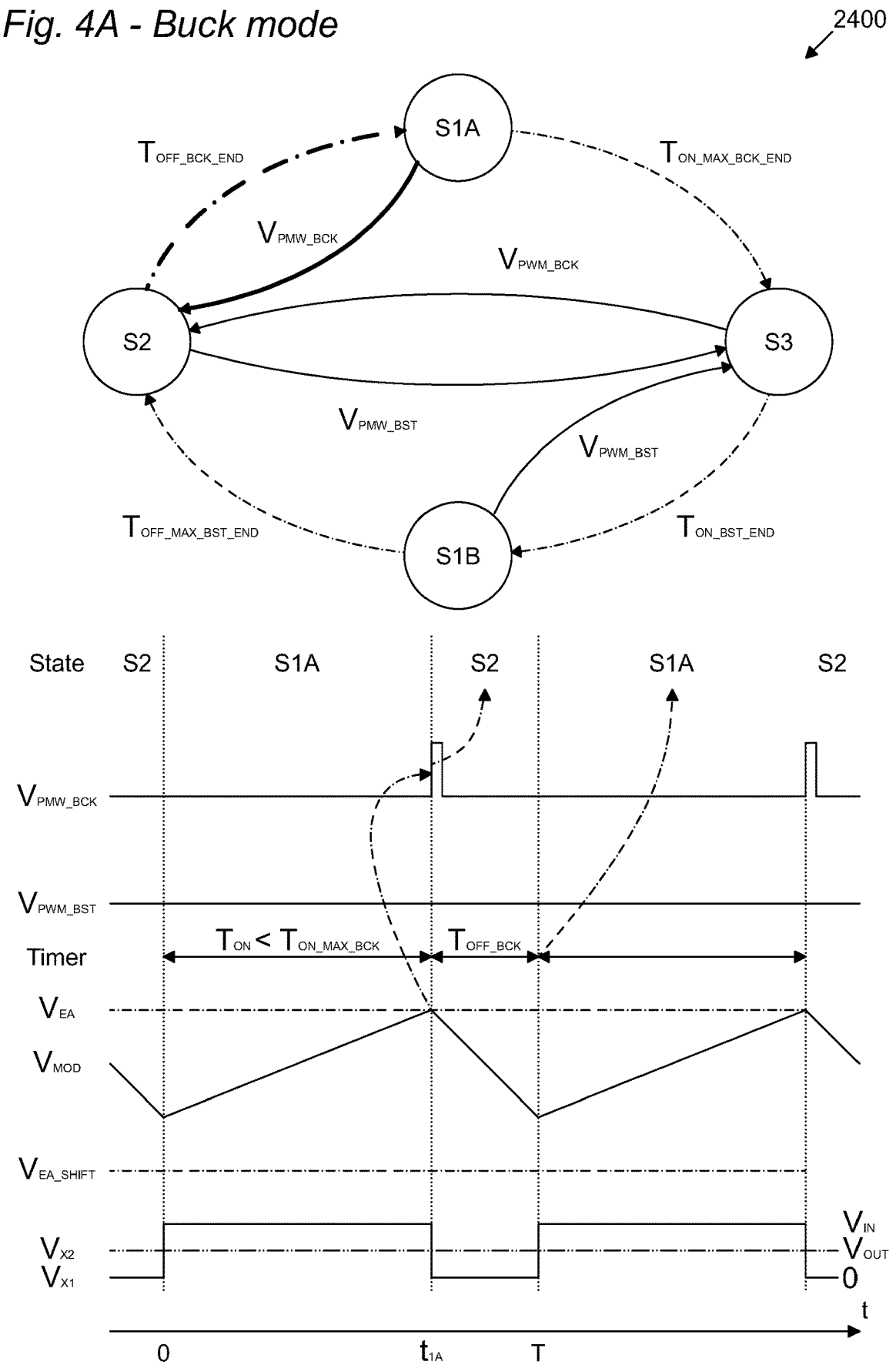

Fig. 4B - Boost mode
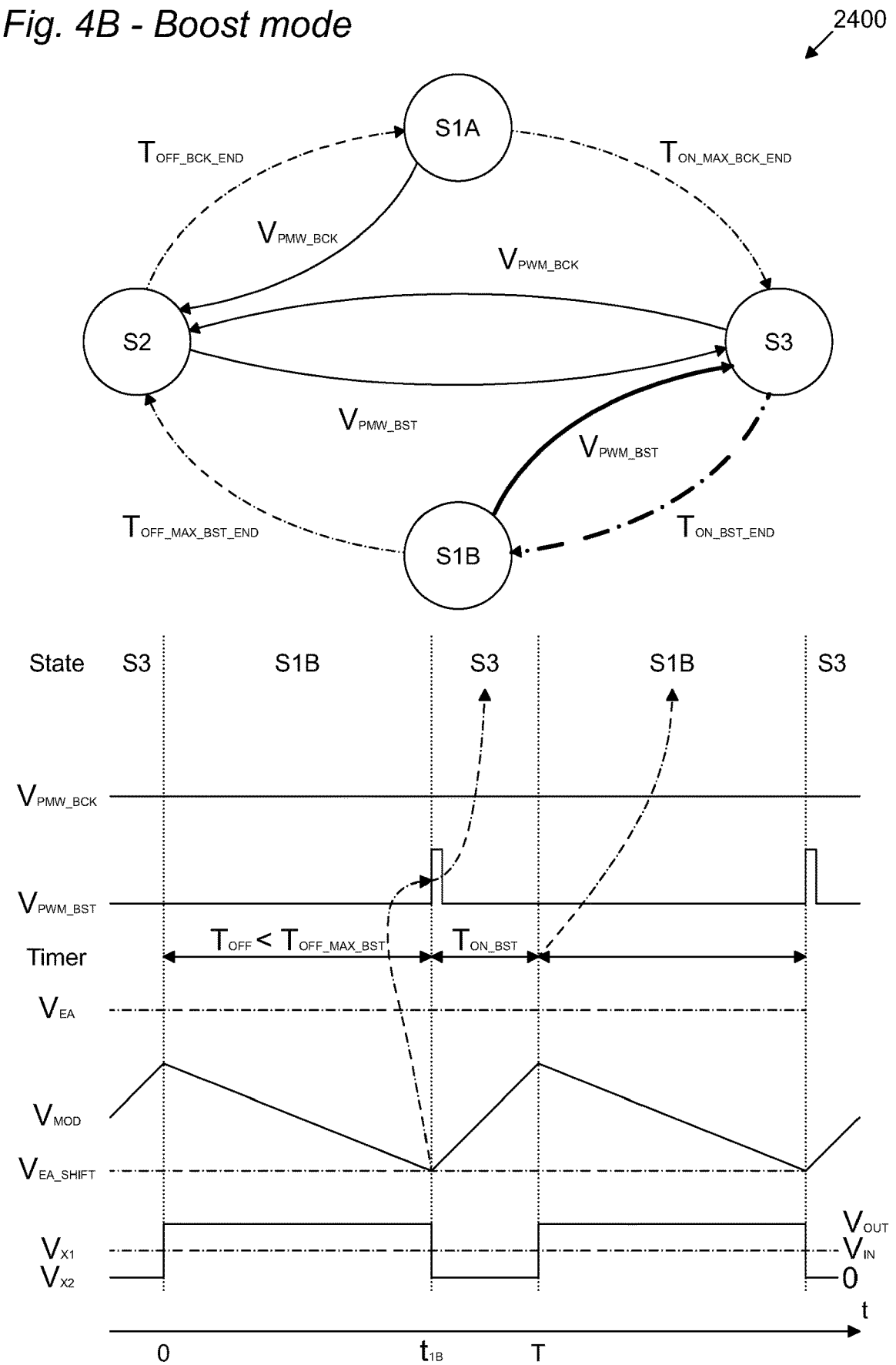

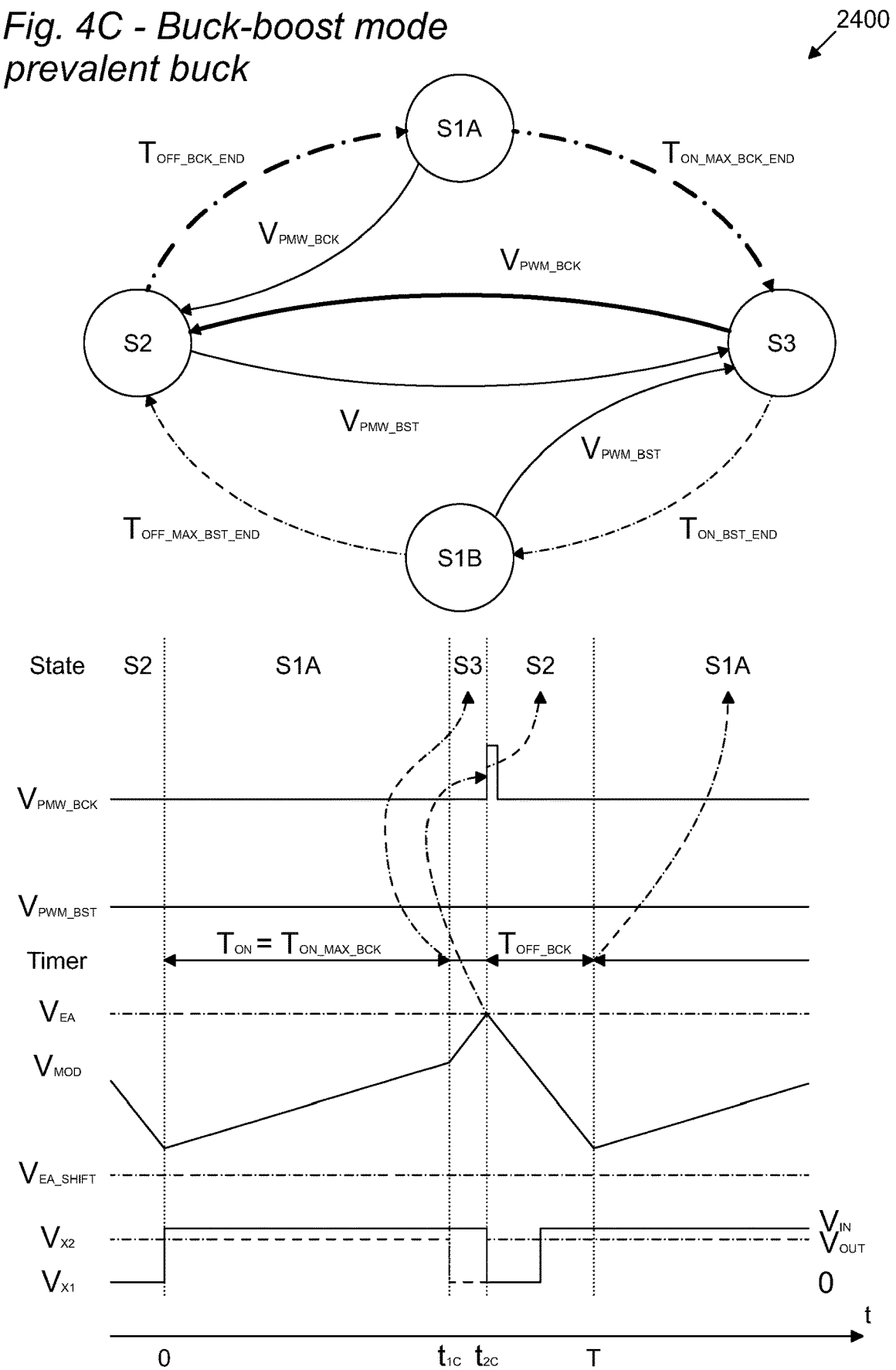
*Fig. 4C - Buck-boost mode prevalent buck*

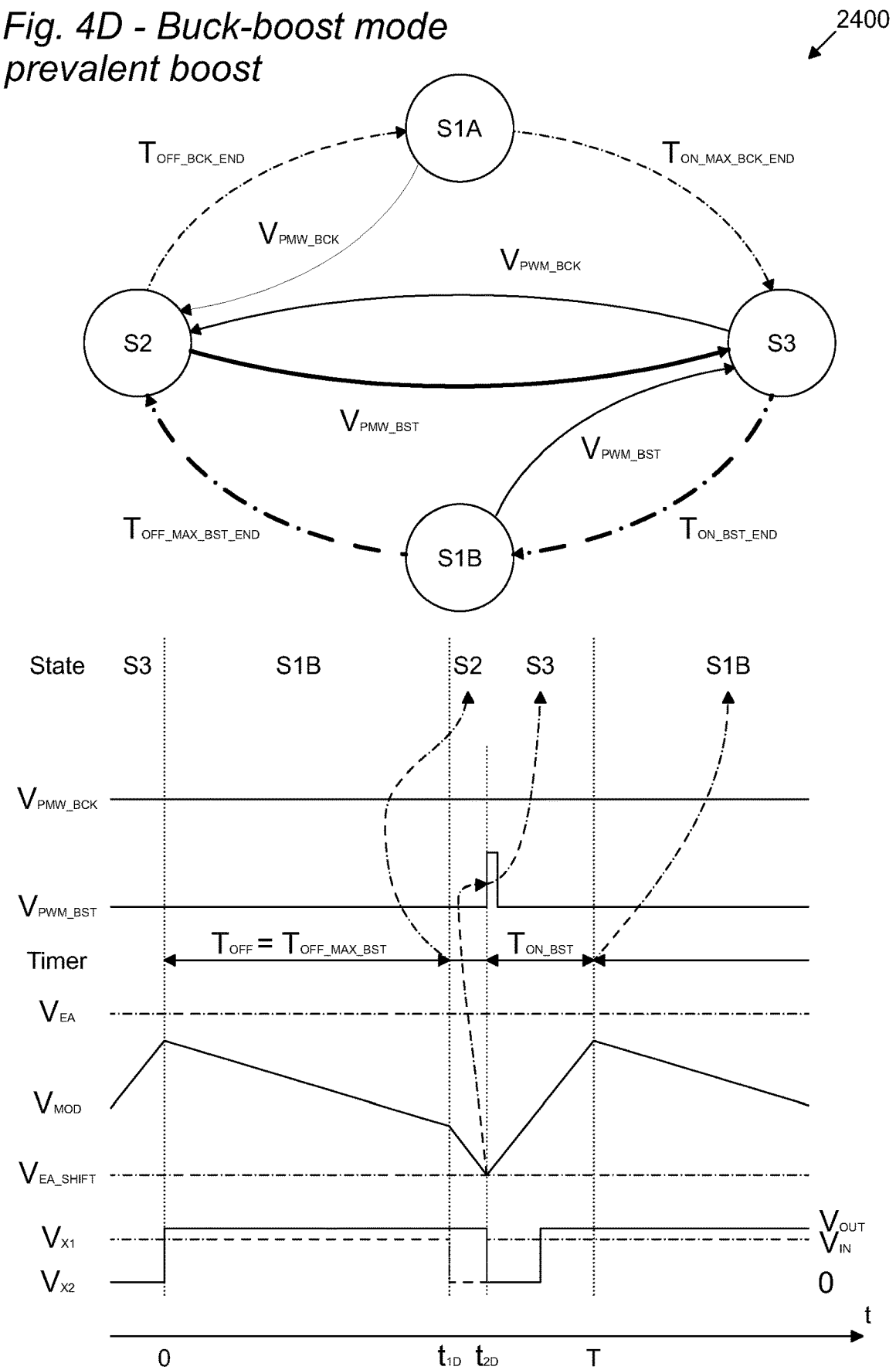
*Fig. 4D - Buck-boost mode prevalent boost*

Fig. 6B - Buck mode
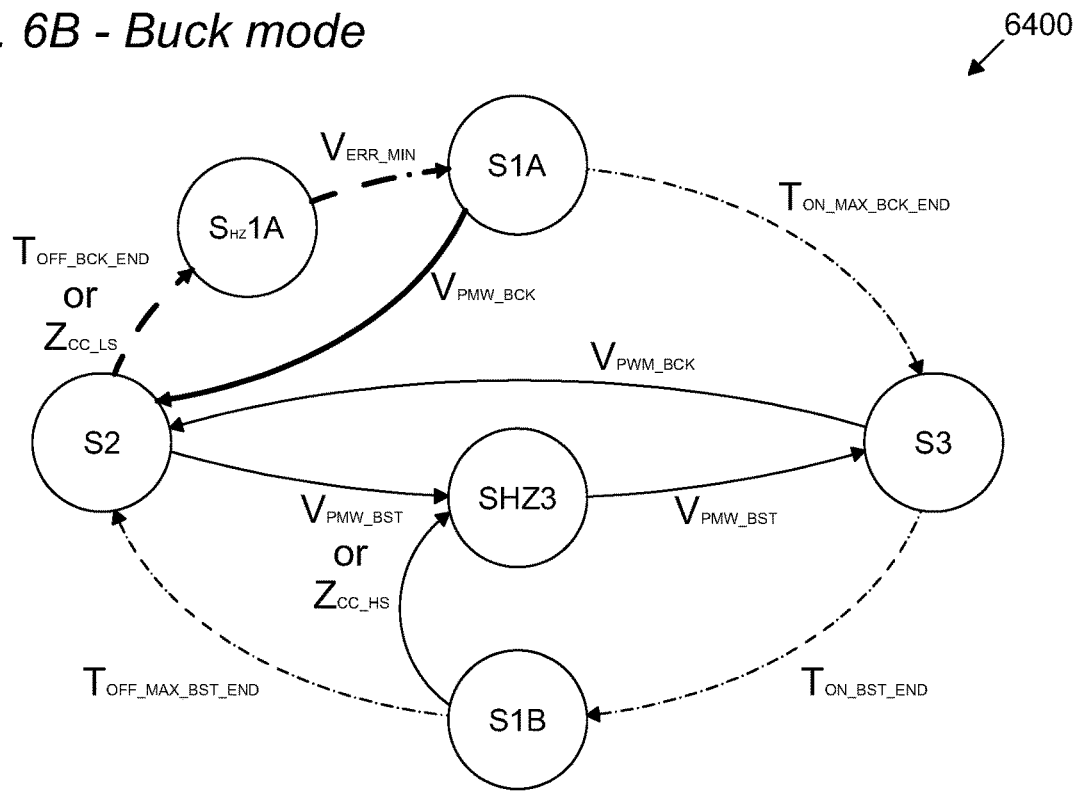
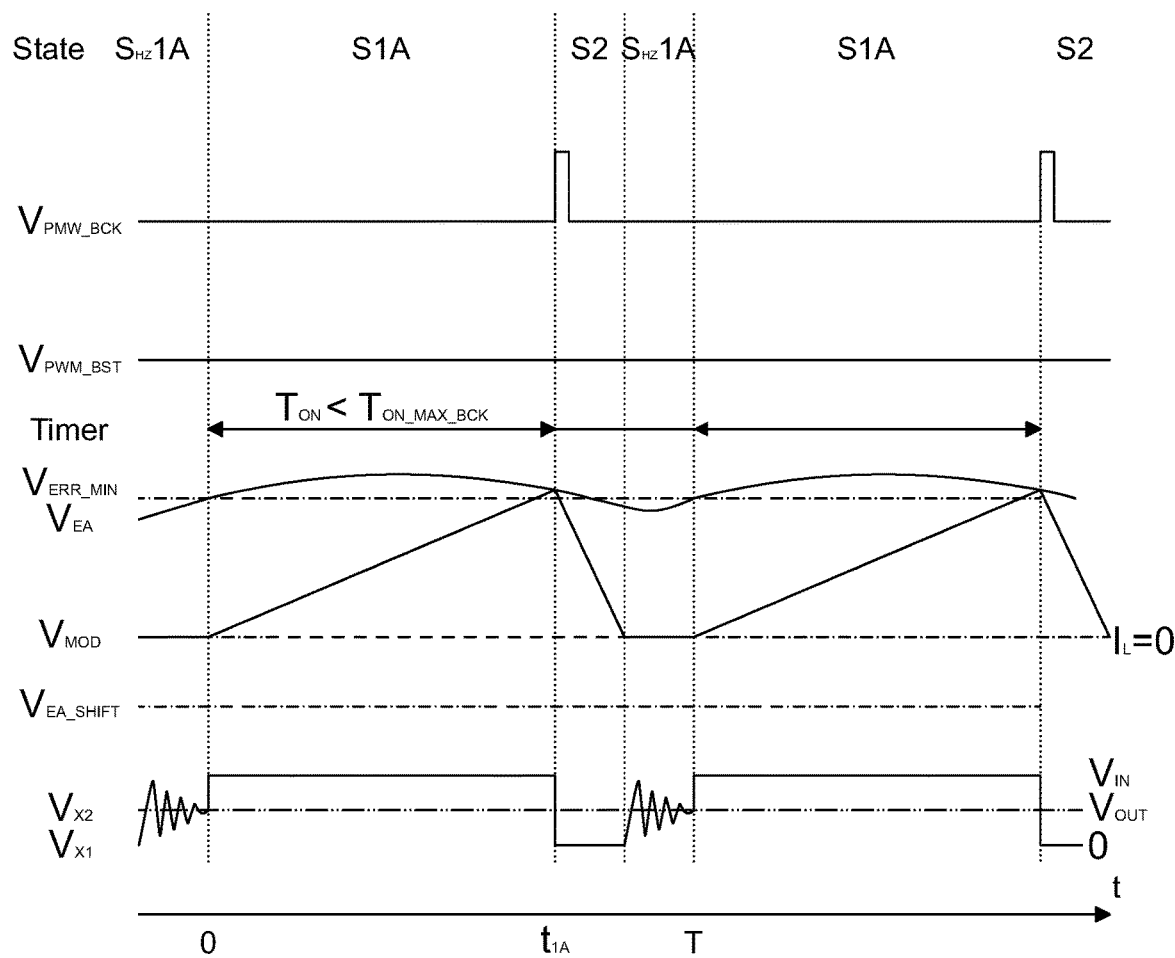

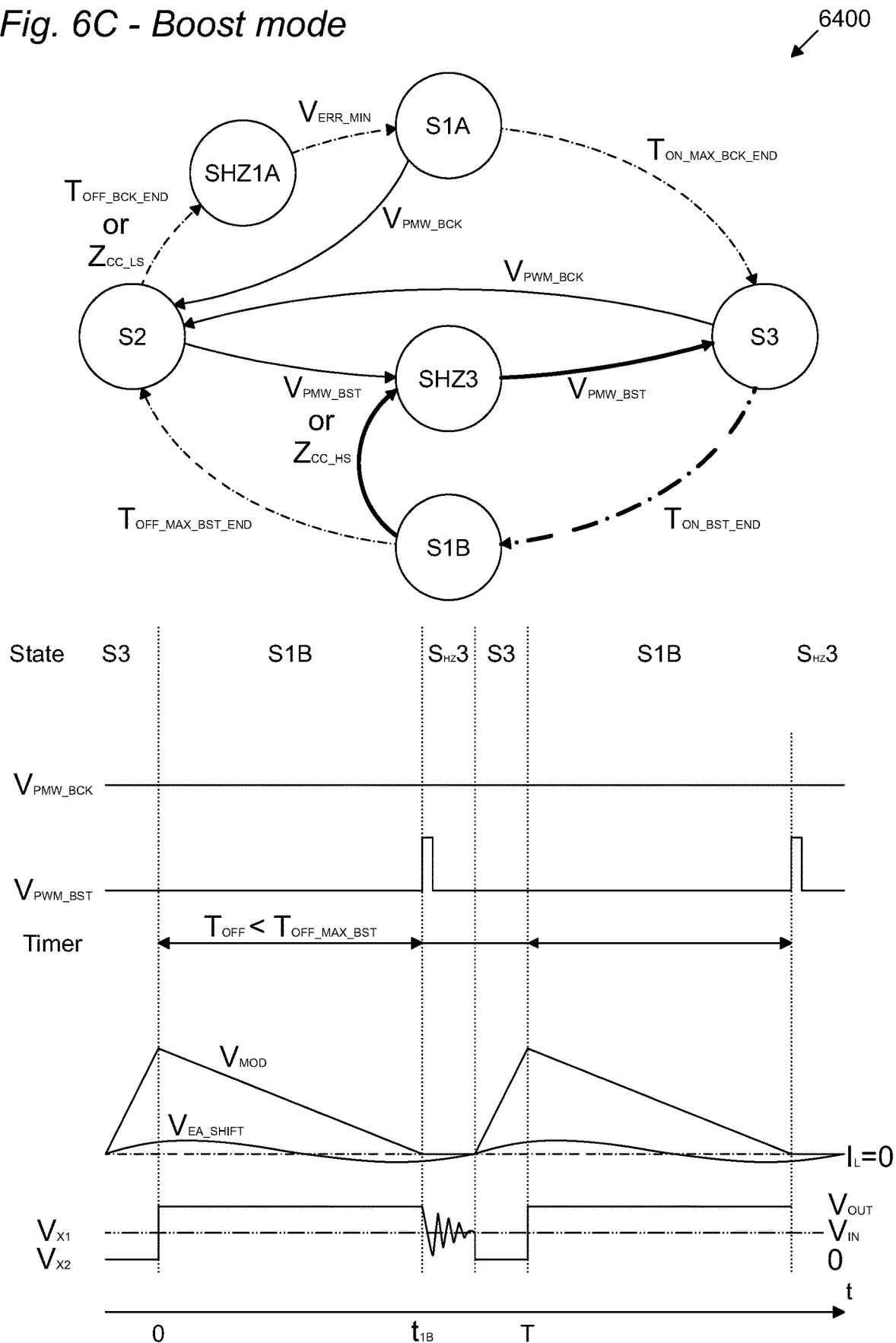
Fig. 6C - Boost mode

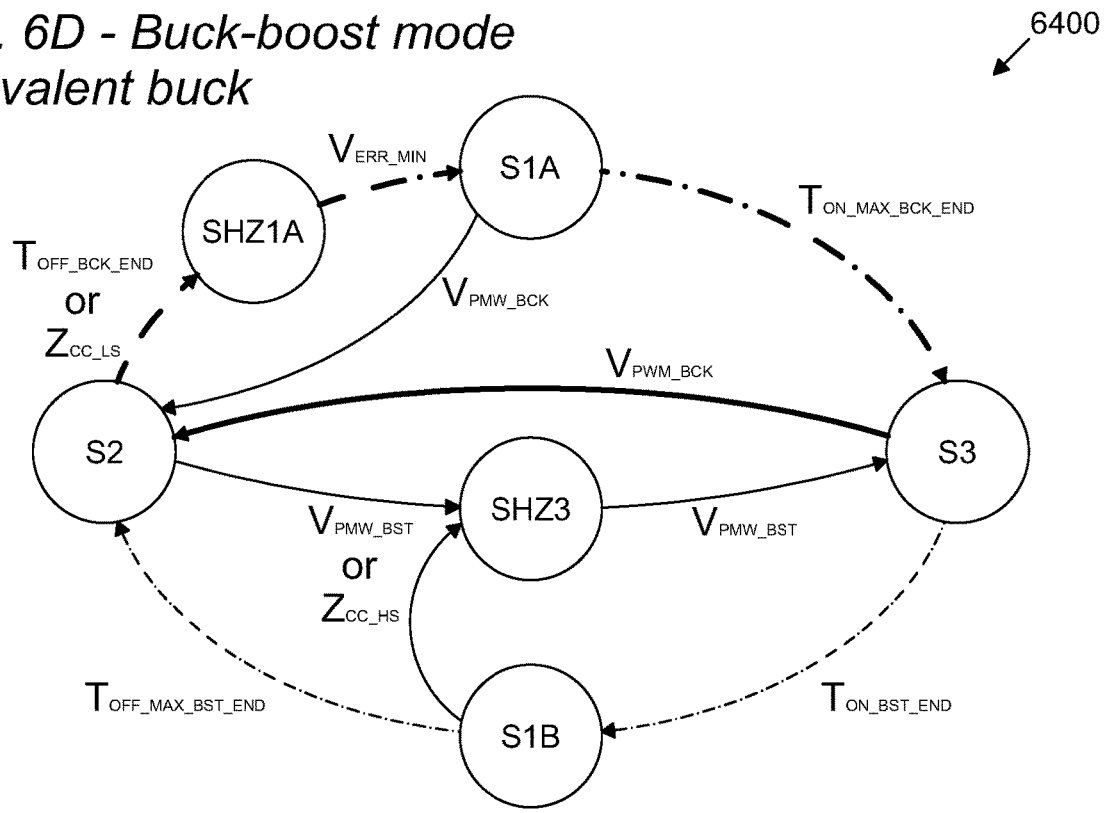
*Fig. 6D - Buck-boost mode prevalent buck*
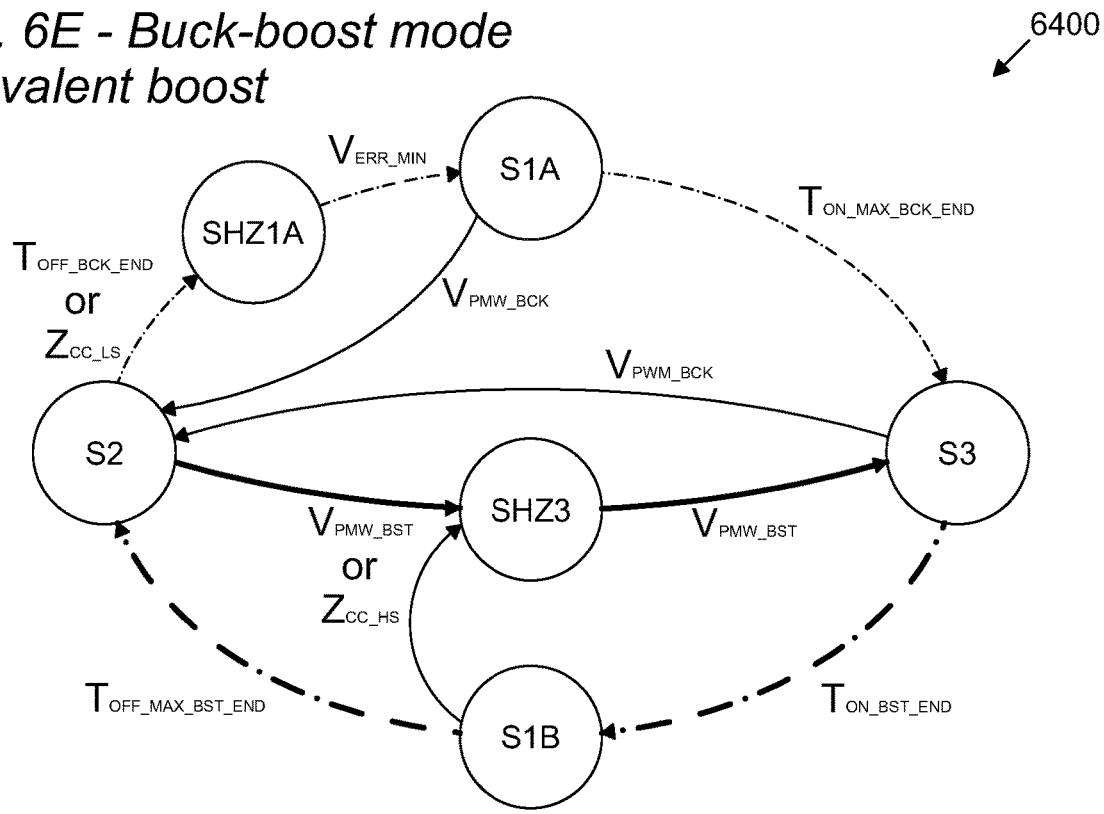
*Fig. 6E - Buck-boost mode prevalent boost*

STATE MACHINE BASED DC/DC CONVERTER

The present application claims priority to EP Application No. 22210473.9, filed Nov. 20, 2022, which is hereby incorporated herein by reference.

The invention deals with a method and a device for DC/DC conversion. In particular, it allows an asynchronous DC/DC buck-boost converter to be implemented which is both simple to implement and provides a reliable operation.

PRIOR ART

Buck-boost converters are used to convert a power source from an Input Voltage $V_{IN}$ to an output voltage $V_{OUT}$ where $V_{OUT}$ can be either lower or higher than $V_{IN}$.

An exemplary application for such scenario is in modern USB type-C based battery chargers where the voltage of the adapter input source can be programmed between 5V and 20V and the battery voltage can vary depending on the battery stack which may be 3V-4.3V for a single cell (1S) up to 12V-17.2V when 4 cells are connected in series (4S).

Typically, the most efficient power converters are limited to convert input voltages $V_{IN}$ into output voltage $V_{OUT}$ that are either lower, as in a buck converter, or higher, as in a boost converter, and they are based on a single bridge architecture implementing two switches. For instance, charger adapters for laptop traditionally only had a 18V-20V output voltage such that they could charge any battery, from 1S to 4S, only operating as a buck converter.

However, the USB type-C power delivery standard imposes the need to be able to charge the battery also using legacy USB chargers, which can only provide 5V. In this case operation as a boost converter is needed to charge 2S, 3S and 4S battery stacks.

In known buck or boost converter the two switches of the single bridge are turned alternatively ON and OFF at a certain frequency and the output voltage is regulated based on the duty cycle, that is, the percentage of time each switch stays ON or OFF. Both buck converters and boost converters suffer from the fact that, when $V_{OUT}$ approaches $V_{IN}$, the duty cycle is either too high, close to 100% in buck mode, or too low, close to 0% in boost mode. This leads to an extremely small ON or OFF time of one of the two the switches, which is impractical to implement and control.

A known solution is known as pulse skipping and consists in limiting the switching frequency and/or limiting $T_{ON}$ or $T_{OFF}$ of the switches to a minimum practical value. However, pulse skipping compromises the stability of the control loop and generates large ripple.

Alternatively, a buck-boost configuration can be implemented. FIG. 1A illustrates a classic buck-boost converter 1000 comprising converting means 1100 and a controller 1200. The converting means 1100 are generally comprising a plurality of active elements, such as switches, and one or more passive elements, such as inductors and/or capacitors. The switches converting means 1100 are driven by the controller so as to convert the input voltage $V_{IN}$ into a desired output voltage $V_{OUT}$.

In the case of FIG. 1A, the converting means 1100 are implemented by a full-bridge configuration with four switches 1111-1114 and one inductor 1120. Buck-boost converter 1000 can perform any type of conversion of the output respect to the input by proper control of the four switches 1111-1114, in a known manner.

The buck-boost converter 1000 thus allows three modes of operation:

buck conversion, when output voltage $V_{OUT}$ is lower than the input voltage $V_{IN}$ boost conversion, when output voltage $V_{OUT}$ is higher than the input voltage $V_{IN}$, buck-boost conversion, when output voltage $V_{OUT}$ is slightly above or below the input voltage $V_{IN}$.

FIG. 1B schematically illustrates a graphical representation of the regions corresponding to the three operation modes described above.

In buck converter mode the switch configuration is:
1111, 1112 turn ON and OFF with non-overlapping phases,
1113 always ON, 1114 always OFF.

In boost converter mode the switch configuration is:
1111 always ON, 1112 always OFF,
1113, 1114 ON and OFF with non-overlapping phases.

In the buck-boost region different techniques can be used to control the four switches. A common goal is to reduce as much as possible the switching activities, so as to minimize power losses, while keeping the output voltage $V_{OUT}$ regulated, while avoiding too small ON/OFF times of the switches.

Several algorithms for controlling the switches 1111-1114 have been proposed in the prior art.

For instance, in the LTC 3440 device from Analog Device (the user manual of which can be found, for instance, at https://www.analog.com/media/en/technical-documentation/data-sheets/3440fd.pdf) the transition between operation modes is done looking at a voltage at an output of an error amplifier. Since the output of this amplifier moves slowly with the bandwidth of the loop, the decision whether to stay in boost, buck-boost or buck region is averaged over a large number of cycles. In order be noise insensitive, a hysteresis must be added on the transition region.

In the ISL9237 from Renesas (the user manual of which can be found, for instance, at https://www.renesas.com/document/dst/is19238-datasheet?language=en&r=507681) the transition is detected by calculating the ratio between $V_{IN}$ and $V_{OUT}$. Also in this case, averaging and hysteresis must be applied to make the transition noise insensitive.

Both products alternate a buck pulse (1111 and 1114 ON) to a boost pulse (1112 and 1113 ON). By modulating the length of these pulses proper output regulation can be guaranteed.

However, since both systems operate at fixed frequency, the switching activity is doubled in buck-boost operation, thus reducing overall efficiency. For this reason, the buck-boost operation is preferably limited to region as narrow as possible, around the $V_{IN}$ equal to $V_{OUT}$ condition.

An alternative way to detect the transition condition is to look at the duty cycle of the buck mode, moving close to or far from 100%, or boost mode, moving close to or far from 0%. However, these methods require high time resolution and are thus usually less practical than detecting voltages, particularly in high frequency switching circuits.

Thus, the way the transition between operation modes is handled in the prior art is generally based on the measure of the input and output voltages using circuits, such as comparators, ADC, etc., which sense the relationship between the input and the output voltages over an observation window, averaging the measured quantities. The critical point of the known methods are the transitions between modes that can create undesired transient, or temporary loss of control of the output voltage. Moreover, in order to avoid continuous jumps in proximity of the cross-over thresholds, some hysteresis is generally introduced, thus increasing the region of buck-boost operation, while it is desirable for this region to be kept as small as possible, as the efficiency of the system tends to be lower in the buck-boost mode.

There is therefore a need to provide a buck-boost converter which operates in an efficient and reliable manner and avoids the problems identified with the prior art.

SUMMARY

In general, the invention relies on the concept that a buck-boost converter can be controlled by a time-based method in order to perform the transition among the different operation modes, namely buck, buck-boost and boost.

Thus, instead of controlling the operation of switches 1111-1114 via signals from comparators, the operation of the switches can be regulated by an asynchronous finite state machine. The finite state machine can decide on a cycle-by-cycle basis, a mode of operation and the corresponding configuration of the switches. In this way decisions are faster and no averaging and hysteresis need to be applied. Similarly the finite state machine can deal with the discontinuous mode and light load operation.

An embodiment of the invention can therefore relate to a buck-boost converter comprising converting means for converting an input voltage into an output voltage, the converting means comprising a plurality of switches and an inductor, a controller for controlling the plurality of switches, comparing means configured to output state change signals based on a comparison of a replica signal and an error signal. The error signal is computed on the basis of a signal representative of a difference between a characteristic of the converting means and a predetermined reference signal. The replica signal is representative of the current flowing through the inductor. The buck-boost converter further comprises a finite state machine configured to receive as input the state change signals and to provide as output state signals for driving the controller.

In this manner, the buck-boost converter is advantageously controlled by a finite state machine. This avoids the shortcomings of the prior art devices.

In some embodiments, the characteristic of the converting means can comprise any among
the output voltage ($V_{OUT}$),
the input voltage ($V_{IN}$),
an input current ($I_{IN}$),
an output current ($I_{OUT}$),
an internal temperature.

Thanks to this approach, the invention allows a high flexibility in what signal is used to create the error signal which is used as input to the finite state machine.

In some embodiments, the comparing means can comprise an error amplifier configured to compare a signal sensed from the characteristic of the converting means to the predetermined reference signal, and to output an error signal based on the result of the comparison.

Thanks to this approach, the error signal can be easily generated with common electronic components.

In some embodiments, the state change signals can comprise a first state change signal, and the comparing means can comprise a comparator configured to compare the error signal to the replica signal, and to output the first state change signal based on the result of the comparison.

Thanks to this approach, the first state change signal can be easily generated with common electronic components.

In some embodiments, the state change signals can comprise a second state change signal, and the comparing means can comprise a comparator configured to compare the error signal to the replica signal, and to output the second state change signal based on the result of the comparison.

Thanks to this approach, the second state change signal can be easily generated with common electronic components.

In some embodiments, the comparing means can comprise a shifter configured to change a value of the error signal by a predetermined shift amount and output a shifted error signal. The comparing means and the finite state machine can be configured such that application of the state change signals to the state machine results in the replica signal to be confined between the error signal and the shifted error signal.

Thanks to this approach, the finite state machine can have an operation which can be implemented in various manners, as long as the replica signal is confined between the error signal and the shifted error signal. Moreover, the difference between the error signal and the shifted error signal can be used to control the operation of the buck-boost converter.

In some embodiments, the comparing means can comprise a shifter configured to change a value of the replica signal by a predetermined shift amount and output a shifted replica signal. The comparing means and the finite state machine can be configured such that application of the state change signals to the state machine results in the replica signal to be confined between the error signal and a shifted error signal, wherein the shifted error signal corresponds to the error signal shifted by the predetermined shift amount.

Thanks to this approach, the finite state machine can have an operation which can be implemented in various manners, as long as the replica signal is confined between the error signal and the shifted error signal. Moreover, the difference between the error signal and the shifted error signal can be used to control the operation of the buck-boost converter.

In some embodiments, the predetermined shift amount can be at least 1%, preferably at least 2%, even more preferably at least 5%, larger than a ripple amplitude of the replica signal, and/or the predetermined shift amount can be at most 15%, preferably at most 10%, even more preferably at most 5%, larger than the ripple amplitude.

The inventors have found that those values allow a particularly efficient and reliable operation of the buck-boost converter.

In some embodiments, the finite state machine can comprise a timer configured to trigger at least one change in the states of the state machine upon expiry of a predetermined time duration.

Thanks to this approach, the finite state machine can also change states depending on a trigger by the timer.

In some embodiments, in buck mode, the timer can be configured to trigger a change from a state in which the inductor is being discharged to a state in which the inductor is being charged after a predetermined first time has expired.

Thanks to this approach, the states are guaranteed to have a minimum duration, thus avoiding the issues with too short states durations, which are present in the prior art.

In some embodiments, in boost mode, the timer can be configured to trigger a change from a state in which the inductor is being charged to a state in which the inductor is being discharged after a predetermined second time has expired.

Thanks to this approach, the states are guaranteed to have a minimum duration, thus avoiding the issues with too short states durations, which are present in the prior art.

In some embodiments, the predetermined first time can be computed as $T_{OFF\_BCK}$ and the predetermined second time can be computed as $T_{ON\_BST}$ so that an inductor's current ripple in buck mode defined as $$\Delta I_{L_{BCK}} = \frac{V_{OUT}}{L} T_{OFF\_BCK}$$

and an inductor's current in boost mode defined as $$\Delta I_{L_{BST}} = \frac{V_{IN}}{L} T_{ON\_BST}$$

are equal.

Thanks to this approach, a constant ripple architecture can be achieved, which is particularly advantageous since ripple is important to determine the output capacitors and/or other filtering passive elements.

In some embodiments, the finite state machine can comprise a plurality of states, and can be configured to change state based on the state change signals and based on the timer.

In this manner it can be particularly ensured that the states have a minimum and/or maximum duration.

In some embodiments, in buck-boost mode, the timer can be configured to trigger a change from a state in which the inductor is being charged to a state in which inductor is being charged at a faster rate, after a predetermined time has expired.

Thanks to this approach, the operation frequency of the finite state machine can be prevented from becoming too slow, which could lead to a loss of stability and control, as well as an increase in ripple voltage.

In some embodiments, in buck-boost mode, the timer can be configured to trigger a change from a state in which the inductor is being discharged to a state in which inductor is being discharged at a faster rate, after a predetermined time has expired.

Thanks to this approach, the operation frequency of the finite state machine can be prevented from becoming too slow, which could lead to a loss of stability and control, as well as an increase in ripple voltage.

In some embodiments, the plurality of switches can comprise a first switch connected between the input voltage and the inductor, a second switch connected between a mass and the inductor, a third switch connected between the inductor and the output voltage, and a fourth switch connected between the inductor and the mass. The finite state machine can comprise a plurality of states wherein in each state two switches are closed are two switches are open.

Thanks to this approach, the switches can be appropriately controlled by the finite state machine with a limited number of states.

In some embodiments, the plurality of states can comprise a first state in which the first switch and the third switch are closed while the second switch and the fourth switch are open, a second state, in which the second switch and the third switch are closed while the first switch and the fourth switch are open, a third state, in which the first switch and the fourth switch are closed while the second switch and the third switch are open.

Thanks to this approach, the switches can be appropriately controlled by the finite state machine with a limited number of states.

In some embodiments, the plurality of states can further comprise two high impedance states.

Thanks to this approach, when a zero current situation is detected, the corresponding half-bridge can be set in high impedance state so to avoid a polarity change in the inductor current, and to reduce power losses.

BRIEF DESCRIPTION OF THE DRAWINGS

FIGS. 4A-4D schematically illustrates various operation modes of the finite state machine 2400;

FIGS. 6B-6E schematically illustrates various operation modes of the finite state machine 6400;

DETAILED DESCRIPTION OF THE DRAWINGS

Figure 1A:
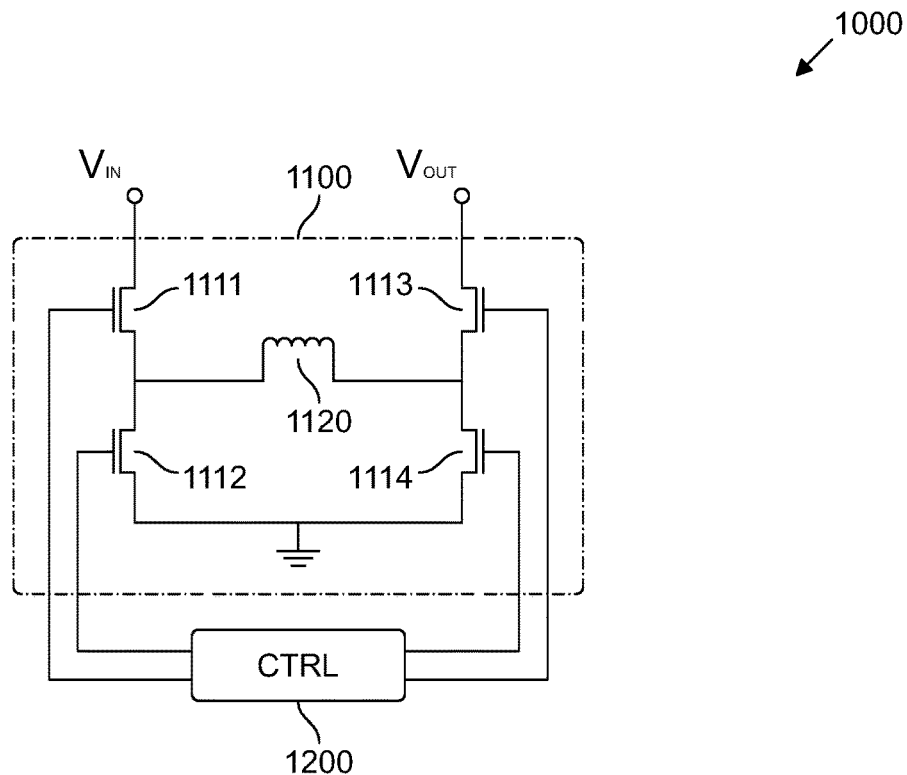
FIG. 1A illustrates a buck-boost converter 1000 in accordance with the prior art.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired.

It is recognized that any circuit or other electrical device disclosed herein may include any number of microcontrollers, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

In general, in order to perform a regulation of the output voltage $V_{OUT}$, a control loop senses the output voltage $V_{OUT}$ and then adjust the duty cycle of the switching activity. In the context of this application, the duty cycle is defined as the ratio between the time needed to charge the inductor 1120 and the total time of a switching period. The invention allows controlling of the duty cycle by means of a finite state machine, as will be explained in the following.

Figure 2A:
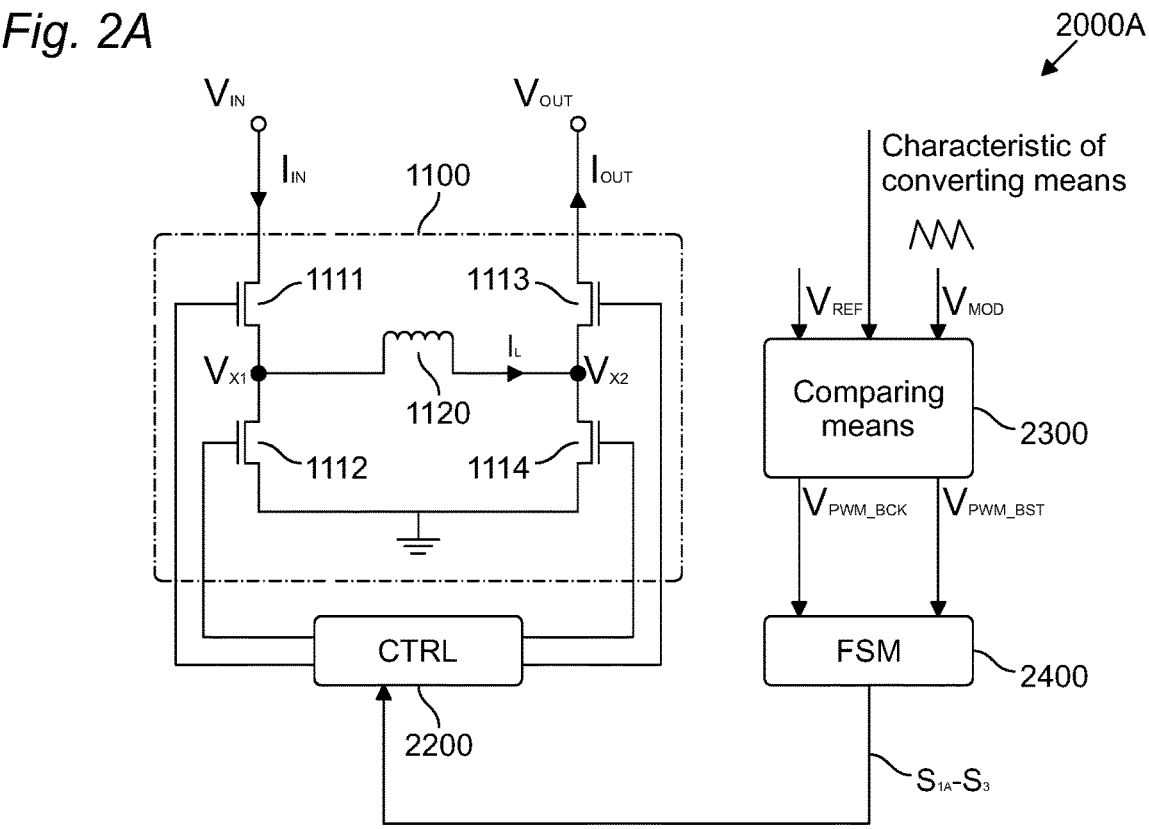
FIG. 2A schematically illustrates a buck-boost converter 2000.

FIG. 2A schematically illustrates a buck-boost converter 2000. Buck-boost converter 2000 comprises converting means 1100, such as, for instance, those already discussed with reference to FIG. 1A, for converting an input voltage $V_{IN}$ into an output voltage $V_{OUT}$, the converting means comprising a plurality of switches 1111-1114 and an inductor 1120.

Buck-boost converter 2000 further comprises a controller 2200 for controlling the plurality of switches 1111-1114. In particular, the controller 2200 is configured to open and close the switches based on state signals S1A-S3, in a manner which will be evident from the following description.

In general, each of the plurality of state signals S1A-S3 configures a state of one or more of the switches 1111-1114, preferably of all of the switches 1111-1114. Thus, by receiving a state signal, the controller 2200 can drive the switched 1111-1114 accordingly.

For instance, a state signal S1A might indicate a state in which the switches 1111 and 1113 are closed, or conducting, while switches 1112 and 1114 are open, or non conducting. Upon receiving a state signal S1A the controller 2200 can therefore drive switches 1111 and 1113 so as to become closed and switches 1112 and 1114 so as to become open.

Buck-boost converter 2000 further comprises comparing means 2300 for outputting state change signals $V_{PWM\_BCK}$, $V_{PWM\_BST}$ based on a comparison of a replica signal $V_{MOD}$ and an error signal $V_{EA}$.

The error signal $V_{EA}$ can be computed on the basis of a signal representative of a difference between a characteristic of the converting means 1100, or a signal of the of the converting means 1100, and a predetermined reference signal $V_{REF}$. The characteristic, or signal, can in general be any voltage and/or current of the converting means 1100 or the temperature thereof. In some embodiments, the any voltage and/or current of the converting means 1100 can preferably comprise any voltage and/or current measured at any of the input and/or output nodes of the converting means 1100. The reference signal $V_{REF}$ can be a signal indicative of an intended value for the characteristic of the converting means 1100. More generally, the reference signal $V_{REF}$ can be a signal set at a predetermined fixed value.

In particular, in some embodiments, the characteristic of the converting means 1100 can be any among the output voltage $V_{OUT}$, the input current $I_{IN}$, the output current $I_{OUT}$, the input voltage $V_{IN}$, or the internal temperature of the converting means 1100. The replica signal $V_{MOD}$ is representative of the current $I_L$ flowing through the inductor 1120.

In the following, the description will mostly be based on the computation of the error signal $V_{EA}$ on the basis of the output voltage $V_{OUT}$ as one possible characteristic of the converting means. Alternative embodiments, in which the error signal $V_{EA}$ is based on the indicated alternative signals, will be clear to those skilled in the art by replacing $V_{OUT}$ with any of the other signals indicated.

In addition to the characteristic of the converting means of to the reference signal $V_{REF}$, the comparing means 2300 can receive as input a replica signal $V_{MOD}$, representing a replica of the current $I_L$ flowing through inductor 1120. In particular, the replica signal $V_{MOD}$ can be any of a voltage current or digital signal in a bijective correspondence with the inductor current.

Figure 2B:
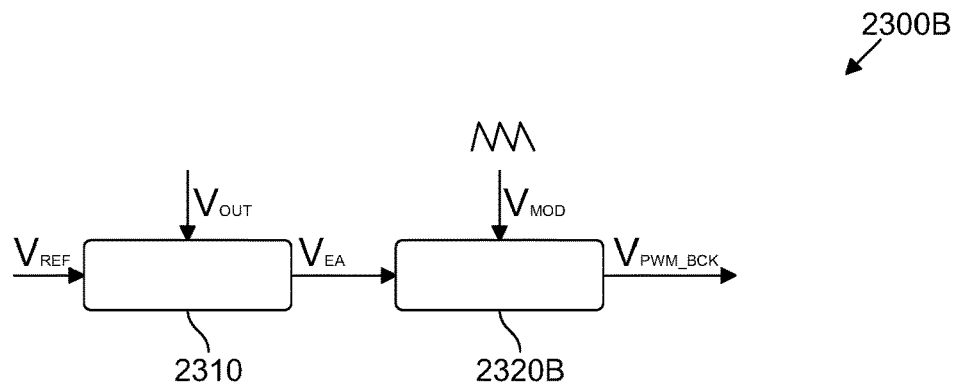
FIGS. 2B, 2C and 2D schematically illustrate possible implementations of converting means 2300B, 23000 and 2300D.
Figure 2C:
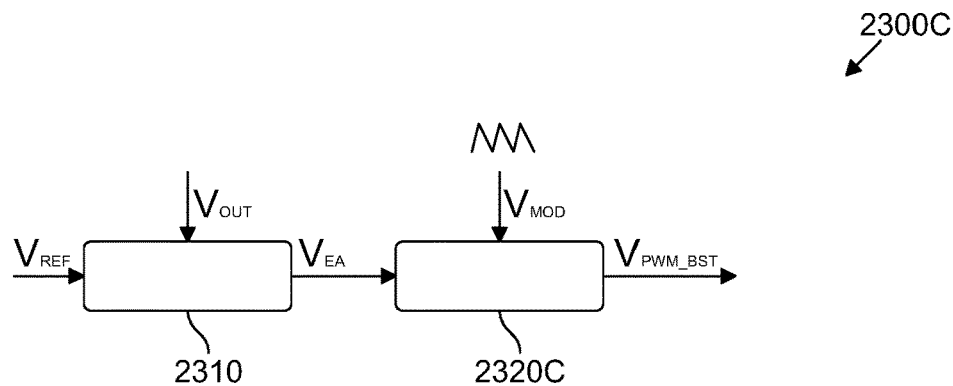
Figure 2D:
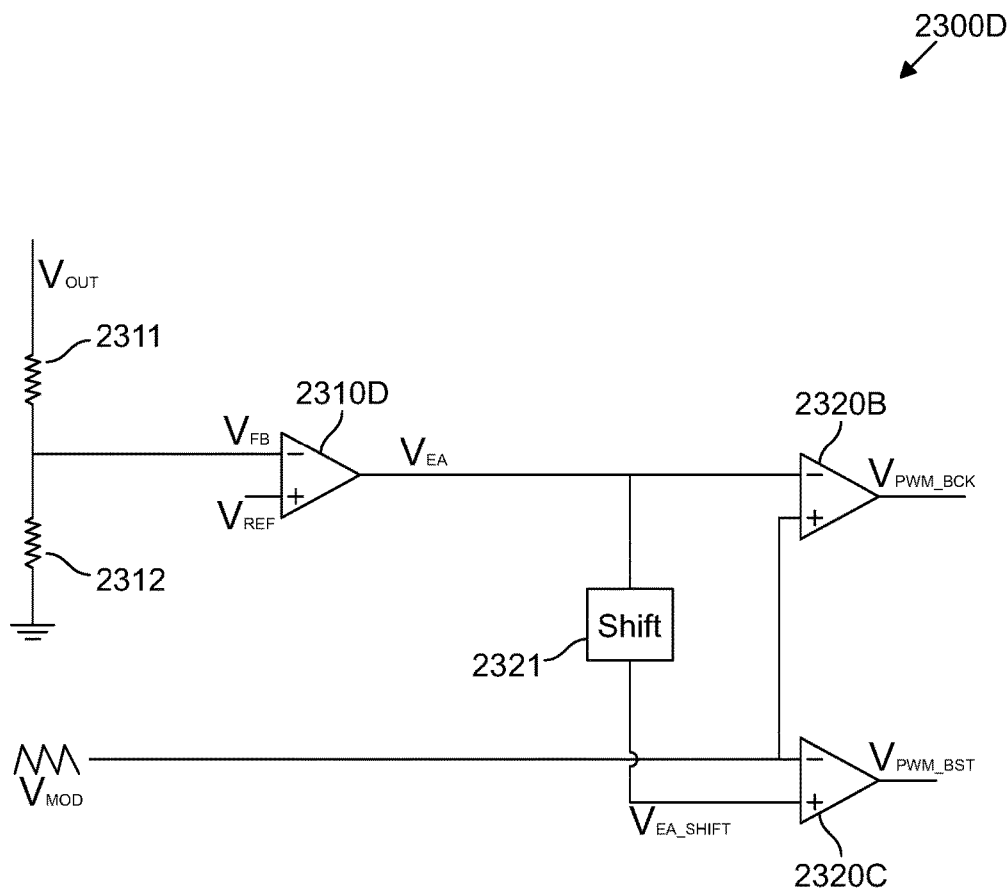

In some of the illustrated embodiments, for instance in FIG. 2D, the replica signal $V_{MOD}$ can be implemented as a voltage such that $$V_{MOD}=f(R_S \times I_L)$$

where $R_S$ is a predefined resistance value, $I_L$ is the current through the inductor 1120 and f is a bijective function. In some embodiments, the bijective function could be, for instance, the identity function and might therefore be removed from the equation.

It will be clear to those skilled in the art that the replica signal $V_{MOD}$ can be measured, or computed, in a plurality of manners. For instance, in some embodiments, the inductor current $I_L$ can be measured through a current sensing on the inductor 1120, for instance through a sense resistor $R_S$, not shown. Alternatively, or in addition, a current sensing can be carried out on the one or more switches conducting current to or from the inductor 1120. Still alternatively, or in addition, the inductor current $I_L$ and its slope can be computed through a pseudo current sensing methodology. In general, those skilled in the art will realize that plurality of manners are known to compute a replica signal $V_{MOD}$, representative of the current flowing through the inductor 1120.

In some embodiments, as illustrated in FIG. 2B, the comparing means 2300 can be implemented by comparing means 2300B. The comparing means 2300B can comprise a first comparator, or error amplifier, 2310 configured to compare the characteristic of the converting means, in the illustrated example being implemented by the output voltage $V_{OUT}$, or a signal $V_{FB}$ sensed from the characteristic of the converting means 1100, such as output voltage $V_{OUT}$, to a predetermined reference signal $V_{REF}$, and to output an error signal $V_{EA}$ based on the result of the comparison. It will be clear to those skilled in the art that the input to the comparison can be chosen to be the characteristic of the converting means 1100, such as $V_{OUT}$ as illustrated in FIG. 2B, or the respective sensed signal $V_{FB}$, as illustrated in FIG. 2D. Since $V_{FB}$ tracks the characteristic of the converting means 1100 in a bijective manner, those two options only differ in the adaptation of the reference signal $V_{REF}$.

The sensed signal $V_{FB}$ can be any of a voltage signal, a current signal, or a digital signal in a bijective correspondence with the characteristic of the converting means 1100. In some illustrated embodiments, such as in FIG. 2D, the sensed signal $V_{FB}$ is illustrated as being a sensed voltage, it will however be clear to those skilled in the art that the invention is not limited thereto. Various manners are known to those skilled in the art for deriving sensed signal $V_{FB}$ in a bijective manner from the characteristic of the converting means 1100.

The reference signal $V_{REF}$ can be any predetermined signal, preferably stable at a given value, which can be used to determine the value of an error between a given characteristic of the converting means 1100, such as $V_{OUT}$ or any of the other signals indicated above with respect to a stable reference value. Also the reference signal $V_{REF}$ can be implemented as a voltage, current or digital signal.

In the embodiments illustrated in FIGS. 2A-2D, the error signal $V_{EA}$ can therefore be computed as a function of the difference between the characteristic of the converting means 1100, or the respective sensed signal $V_{FB}$, and the reference signal $V_{REF}$. The error signal $V_{EA}$ can also be implemented as a voltage, current or digital signal.

In some embodiments, the state change signals $V_{PWM\_BCK}$, $V_{PWM\_BST}$ can comprise a first state change signal $V_{PWM\_BCK}$. As further illustrated in FIG. 2B, the comparing means 2300B can further comprise comparator 2320B configured to compare the error signal $V_{EA}$ to the replica signal $V_{MOD}$, and to output the first state change signal $V_{PWM\_BCK}$ based on the result of the comparison.

In some embodiments, the first state change signal $V_{PWM\_BCK}$ can be a signal having at least a first value and a second value, and the comparator 2320B can be configured to trigger a change in the first state change signal $V_{PWM\_BCK}$ from the first value to the second value when the replica signal $V_{MOD}$ crosses the error signal $V_{EA}$. The first state change signal $V_{PWM\_BCK}$ can be implemented as a voltage, current or digital signal.

As will become clearer from the following, switching of the first controlling signal $V_{PWM\_BCK}$ can be used to determine the end of a state of the finite state machine 2400, for instance, with reference to the further description, it can be used to determine the end of state S1A.

Moreover, in some embodiments, the state change signals $V_{PWM\_BCK}$, $V_{PWM\_BST}$ can comprise a second state change signal $V_{PWM\_BST}$. As illustrated in FIG. 2C, the comparing means 2300 can be implemented by comparing means 2300C. Comparing means 2300C can further comprise a comparator 2320C configured to compare the error signal $V_{EA}$ to the replica signal $V_{MOD}$, and to output the second state change signal $V_{PWM\_BST}$ based on the result of the comparison.

It is noted that the comparing means 2300C can further comprise an error amplifier 2310, as previously described for comparing means 2300B. In case both comparing means 2300B and comparing means 2300C are implemented, it is therefore sufficient to implement a single error amplifier 2310, for instance as illustrated by error amplifier 2310D, in FIG. 2D.

In some embodiments, the second state change signal $V_{PWM\_BST}$ can be a signal having at least a first value and a second value, and the comparator 2320C can be configured to trigger a change in the second state change signal $V_{PWM\_BST}$ from the first value to the second value when the replica signal $V_{MOD}$ crosses the error signal $V_{EA}$. The second state change signal $V_{PWM\_BST}$ can be implemented as a voltage, current or digital signal.

As will become clearer from the following, switching of the second controlling signal $V_{PWM\_BST}$ can be used to determine the end of a state of the finite state machine 2400, for instance, with reference to the further description, it can be used to determine the end of state S1B.

Thus, by comparing the replica signal $V_{MOD}$ to the error signal $V_{EA}$ it is possible to control triggering of the state change signals $V_{PWM\_BCK}$ and/or $V_{PWM\_BST}$. This applies to an error signal $V_{EA}$ generated on the basis of any of the signals previously described.

Buck-boost converter 2000 further comprises a finite state machine 2400 receiving as input the state change signals $V_{PWM\_BCK}$, $V_{PWM\_BST}$ and providing as output state signals for driving the controller 1200.

In this manner it is advantageously possible to trigger a change of states in the finite state machine 2400 based on a result of the comparisons of the replica signal $V_{MOD}$ to the error signal $V_{EA}$.

FIG. 2D schematically illustrates comparing means 2300D, which can be a possible implementation of comparing means 2300.

Comparing means 2300D differ from previously described comparing means due, among others, to how $V_{OUT}$, as an example of the characteristic of the converting means (1100), is processed to obtain $V_{FB}$. In particular, comparing means 2300D comprises a voltage divider comprising resistances 2311D and 2312D. This allows to provide the sensed signal $V_{FB}$ based on the output voltage $V_{OUT}$. The sensed signal $V_{FB}$ can then be compared to the predetermined reference signal $V_{REF}$ through the error amplifier 2310D, for instance an analog amplifier. This provides an exemplary implementation of comparing means 2300D based on analog voltage signals, which is relatively simple to implement. As previously described, it is understood that the invention is not limited thereto an alternative implementation, based on current signals and/or digital signals could be provided instead.

Moreover, in comparing means both comparators 2320B and 2320C are implemented. In this case, a shifter 2321 can be inserted between the error signal $V_{EA}$ and one of the comparators 2320B and 2320C, or between the replica signal $V_{MOD}$ and one of the comparators 2320B and 2320C. In the embodiment illustrated in FIG. 2D, the shifter 2321 receives as input error signal $V_{EA}$ and outputs a shifted version of it, in form of shifted error signal $V_{EA\_SHIFT}$. As it will be described in detail, the finite state machine 2400 is configured so that, application of the resulting control signals $V_{PWM\_BCK}$ and $V_{PWM\_BST}$ to it, results in the replica signal $V_{MOD}$ to be confined between $V_{EA}$ and $V_{EA\_SHIFT}$.

That is, the comparing means 2300D comprise a shifter 2321 configured to change a value of the error signal $V_{EA}$ by a predetermined shift amount and output a shifted version of the error signal $V_{EA\_SHIFT}$. The shifter 2321 can be any circuit capable of changing the value of the error signal $V_{EA}$. In the illustrated embodiment, the shifter 2321 increases the value of the error signal $V_{EA}$ by a predetermined amount resulting in the shifted error signal $V_{EA\_SHIFT}$, it will however be clear that the invention can also be implemented if the shifter reduces the value of the error signal $V_{EA}$ by a predetermined amount.

As will result from the following description, the comparing means 2300D and the finite state machine 2400 are configured such that application of the state change signals $V_{PWM\_BCK}$, $V_{PWM\_BST}$ to the state machine 2400 results in the replica signal $V_{MOD}$ to be confined between the error signal $V_{EA}$ and the shifted version of the error signal $V_{EA\_SHIFT}$.

It will be clear to those skilled in the art that there are several possible manners for implementing this feature, which can be implemented by changing the design of the comparing means 2300D and/or of the finite state machine 2400. That is, any circuit design which structurally achieves this operation can be implemented and the invention is not to be limited to the specifically illustrated embodiment, which is intended to provide one possible implementation example.

For instance, instead of shifting the error signal $V_{EA}$, it is clear that a similar operation can be obtained by shifting the replica signal $V_{MOD}$. In the specific illustrated embodiment this could be achieved by lowering the replica signal $V_{MOD}$ provided as input to the comparator 2320C by the same shift amount previously described.

Thus, in some embodiments, the comparing means 2300D can comprise a shifter 2321 configured to change a value of the replica signal $V_{MOD}$ by a predetermined shift amount and output a shifted replica signal, not illustrated. The comparing means 2300D and the finite state machine 2400 can then be configured such that application of the state change signals $V_{PWM\_BCK}$, $V_{PWM\_BST}$ to the state machine 2400 results in the replica signal $V_{MOD}$ to be confined between the error signal $V_{EA}$ and a shifted error signal $V_{EA\_SHIFT}$, wherein the shifted error signal $V_{EA\_SHIFT}$ corresponds to the error signal $V_{EA}$ shifted by the predetermined shift amount.

Another possible definition of the operation of the comparing means 2300D is that the comparing means is provided with a shifter, as previously described, so that the generation of a first state change signal, $V_{PWM\_BCK}$ in the illustrated embodiment, is derived from a comparison of the error signal $V_{EA}$ and of the replica signal $V_{MOD}$, while the generation of a second state change signals, $V_{PWM\_BST}$ in the illustrated embodiment, is derived from a comparison of the error signal $V_{EA}$ and of the replica signal, with one of those being shifted by the predetermined shift amount.

The choice of the predetermined shift amount, for instance between $V_{EA}$ and $V_{EA\_SHIFT}$ as illustrated, or between the replica signal $V_{MOD}$ and the respectively shifted version, can be advantageously related to a ripple amplitude of $V_{MOD}$, which is generally directly proportional to the ripple of the inductor's current. By choosing a shift amount just slightly bigger than the ripple of $V_{MOD}$ it is advantageously possible to guarantee a smooth transition between the various modalities of the buck-boost converter 2000, namely buck, buck-boost and boost.

In some embodiments, the predetermined shift amount can therefore be at least 1%, preferably at least 2%, even more preferably at least 5%, larger than the ripple amplitude of $V_{MOD}$. Alternatively, or in addition, the predetermined shift amount can therefore be at most 15%, preferably at most 10%, even more preferably at most 5%, larger than the ripple amplitude of $V_{MOD}$. The inventors have found that those values, and their combination, are particularly advantageous in achieving a smooth transition.

In some embodiments, as will become clearer from the following, this is advantageously helped by the fact that the ripple of the inductor's current can be controlled by generating timing intervals in timer 2420, for instance $T_{OFF\_BCK}$ and/or $T_{ON\_BST}$ as will be discussed further in the description, in such a way the ripple does not significantly change when either $V_{IN}$ and $V_{OUT}$ are changing.

It has thus been shown how the error signal $V_{EA}$ can be fed back into the feedback loop leading to the controller 2200, through its effect on the state change signals, which in turn have an effect on the finite state machine 2400, which is driving the controller 2200. For those skilled in the art, it will be evident that other control methods that includes stabilization of the feedback network can be used to generate the error signal $V_{EA}$. Also, other electrical parameters such as any of input current, output current, etc. can be controlled by this method. For the purpose of this invention the way the error signal $V_{EA}$ is generated is irrelevant as long as the control loop is stable and the signal $V_{EA}$ changes with a slower frequency than the switching frequency of the switches 1111, 1114, a condition that is always true under a stable control loop.

Figure 2E:
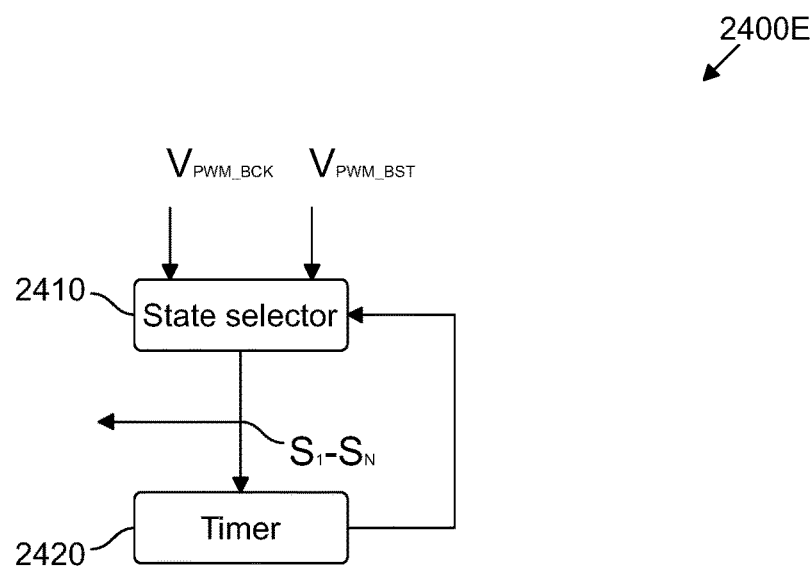
FIG. 2E schematically illustrates a possible implementation of a finite state machine 2400E.

Moreover, in addition to the change of states caused by the output of the comparing means 2300, as shown in FIG. 2E in some embodiments the finite state machine 2400 can comprise a timer 2420, which can be configured to trigger at least one change in the states of the state machine 2400 upon expiry of a predetermined time duration.

In buck mode, the timer 2420 is configured to trigger a change from a state, for instance state S2 as will be described in the following, in which the inductor 1120 is being discharged to a state, for instance state S1A as will be described in the following, in which inductor 1120 is being charged after a predetermined time $T_{OFF\_BCK}$ has expired.

Alternatively, or in addition, in boost mode, the timer 2420 is configured to trigger a change from a state, for instance state S3 as will be described in the following, in which the inductor 1120 is being charged to a state, for instance state S1B as will be described in the following, in which inductor 1120 is being charged after a predetermined time $T_{ON\_BST}$ has expired.

In this manner, the states are guaranteed to have a minimum duration, thus avoiding the issues with too short states durations present in the prior art.

Figure 3A:
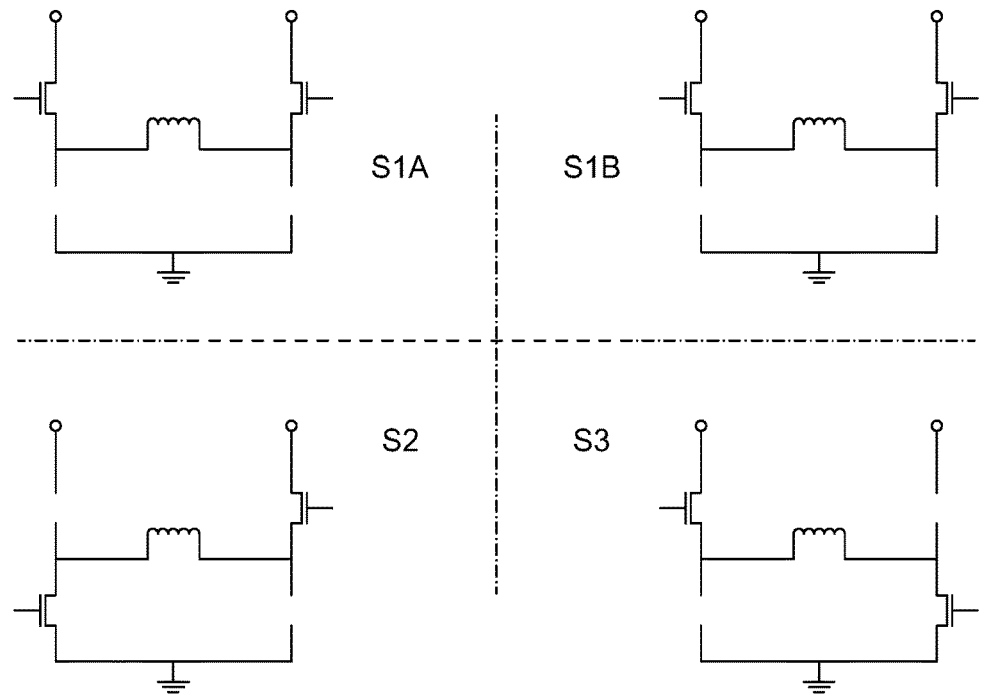
FIG. 3A schematically illustrates four possible states S1A, S1B, S2 and S3 of the switches 1111-1114.

FIG. 3A schematically illustrates four possible states of the switches 1111-1114. In the drawing, the switches which are closed, thus connecting, are illustrated.

Conversely, the switches which are open, thus not connecting, are not illustrated.

That is, the buck-boost converter 2000 can comprise a plurality of switches, preferably four switches, comprising
 a first switch 1111 connected between the input voltage $V_{IN}$ and the inductor 1120,
 a second switch 1112 connected between a mass and the inductor 1120,
 a third switch 1113 connected between the inductor 1120 and the output voltage $V_{OUT}$,
 a fourth switch 1114 connected between the inductor 1120 and the mass.

The finite state machine 2400 can then comprise a plurality of states S1A, S1B, S2, S3 wherein, in each state, two switches are closed are two switches are open.

In particular, in some embodiments, the plurality of states can be preferably at least three states, even more preferably four states, and comprise a first state S1A, S1B, in which the first switch 1111 and the third switch 1113 are closed while the second switch 1112 and the fourth switch 1114 are open. The first state can also be understood as two separate states S1A and S1B. In state S1A, the inductor 1120 is being charged.

This state can be used in buck mode, or in buck-boost mode, in state S1B a similar configuration of the switches applies. However, in this state the inductor 1120 is being discharged. This state can be used in boost mode, or in buck-boost mode.

The plurality of states can further comprise a second state S2, in which the second switch 1112 and the third switch 1113 are closed while the first switch 1111 and the fourth switch 1114 are open. In this state, the inductor 1120 is being discharged. This state can be used in buck mode, or in buck-boost mode.

The plurality of states can a third state S3, in which the first switch 1111 and the fourth switch 1114 are closed while the second switch 1112 and the third switch 1113 are open.

In this state, the inductor 1120 is being discharged. This state can be used in boost mode, or in buck-boost mode.

Figure 3B:
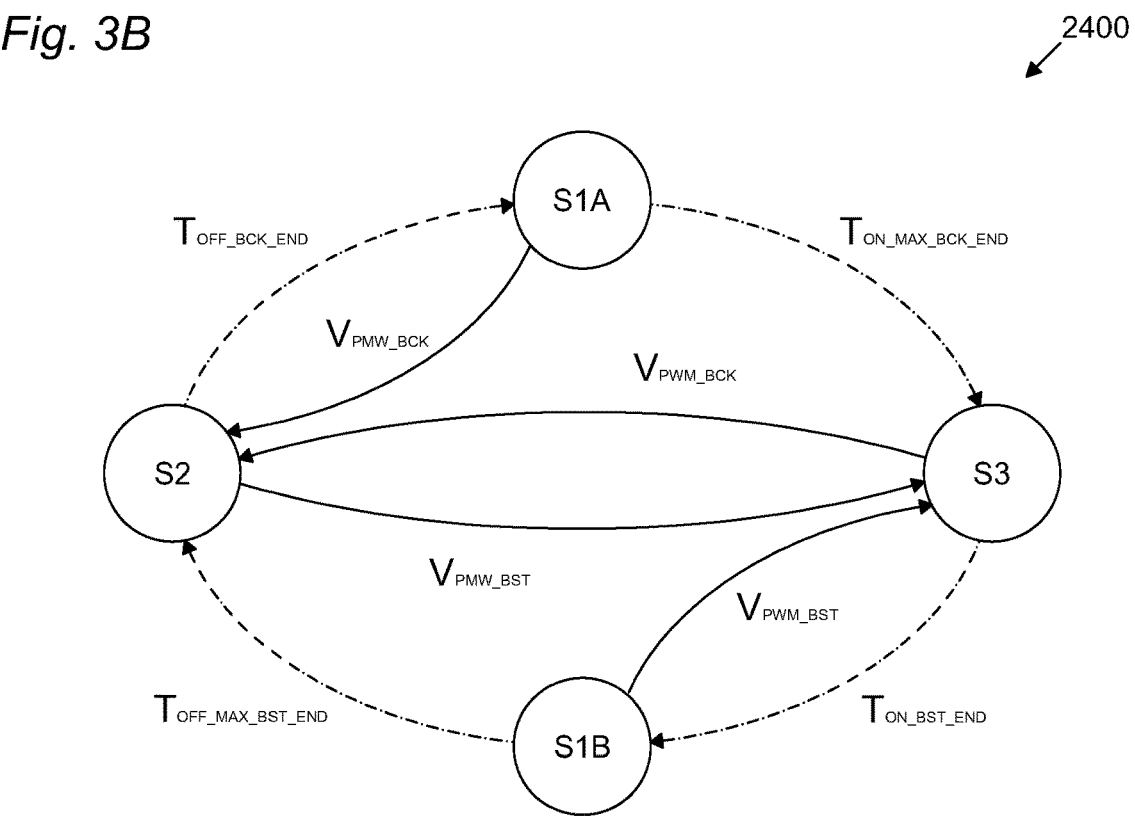
FIG. 3B schematically illustrates a possible configuration of the states S1A, S1B, S2 and S3 in finite state machine 2400.

FIG. 3B schematically illustrates a possible configuration of the states in the finite state machine 2400. In FIG. 3B, state changes which are triggered by a change in one of the state change signals $V_{PWM\_BCK}$, $V_{PWM\_BST}$ are indicated in solid lines. On the other hand, state changes which are triggered by the timer 2420 are indicated in dashed lines.

As it is visible from FIG. 3B, the finite state machine 2400 comprises a plurality of states S1A-S3, preferably at least four states, even more preferably four states, and is configured to change state based on the state change signals $V_{PWM\_BCK}$, $V_{PWM\_BST}$ and based on the timer 2420.

In preferred embodiments, each state S1A-S3 has two output connections to other states. In particular, one output connection is triggered by a state change signal $V_{PWM\_BCK}$, $V_{PWM\_BST}$ while the other is triggered by the timer 2420. In this case, the first trigger which activates in time activates the respective state change.

In further preferred embodiments, two states, S1A and S1B, have one input connection each, from other states. In further preferred embodiments, two states, S2 and S3, have three input connection each, from other states. Alternatively, or in addition, in some embodiments, some states, preferably two, have more input connection than some other states, preferably two. Alternatively, or in addition, in some embodiments, some states, preferably employed in buck-boost operation, have more input connection than some other states, preferably not employed in buck-boost operation.

This configuration allows the buck-boost converter to operate in any of buck mode, boost mode, and buck-boost mode. For the purpose of the present description, the buck-boost mode can also be distinguished in a prevalent buck buck-boost mode, in which the output voltage $V_{OUT}$ is close to, but lower than, the input voltage $V_{IN}$, and a prevalent boost buck-boost mode, in which the output voltage $V_{OUT}$ is close to, but higher than, the input voltage $V_{IN}$. In some embodiments, the condition of being close to can be understood as the two signals differing by less than 10%, preferably 5%, even more preferably less than 2%.

FIGS. 4A-4D schematically illustrates the various operation modes. For each figure, the relevant states and signals controlling the mode cycle are illustrated. Moreover, for each figure, a schematic representation of the signals relevant for the understanding of the buck-boost converter operation are also illustrated.

In particular, in addition to the previously described signals, in each of the figures, the signals $V_{X1}$ and $V_{X2}$ are indicated. Those correspond to the switching nodes of the two half bridges, namely the two terminals of the inductor 1120, as schematically illustrated in FIG. 2A. Their value is schematically represented with respect to a zero voltage level, input voltage $V_{IN}$ and output voltage $V_{OUT}$.

In FIG. 4A, the operation of the buck mode is illustrated. In this mode, $V_{OUT}$ is lower than $V_{IN}$. Starting from time t=0, the finite state machine 2400 is in state S1A, so that current flows through inductor 1120 charging it, since $V_{IN}$ is higher than $V_{OUT}$.

This leads to $V_{MOD}$ rising, until it reaches $V_{EA}$ at point $t_{1A}$. At this point, comparator 2320B causes a switch of first state change signal $V_{PWM\_BCK}$ from the first value, for instance a low value in the figure, to the second value, for instance a high value in the figure.

As noted in FIG. 4A, this happens before the ON buck time $T_{ON}$, that is, the time during which state S1A is active, reaches a predetermined value $T_{ON\_MAX\_BCK}$. In fact, reaching the predetermined value $T_{ON\_MAX\_BCK}$ would result in a change of state S1A to S3, as schematically indicated by the condition $T_{ON\_MAX\_BCK\_END}$ in the top portion of the FIG. 4A illustrating the finite state machine.

Since the condition $V_{MOD} \geq V_{EA}$, that is, the crossing of $V_{EA}$ by $V_{MOD}$, happens before, a change in the first state change signal $V_{PWM\_BCK}$ is triggered and the finite state machine 2400 moves to state S2 at time $t_{1A}$.

During state S2, the inductor 1120 is being discharged so that $V_{MOD}$ decreases. The signal $V_{PWM\_BCK}$ therefore almost immediately changes back to a low value, as schematically indicated.

As indicated on the schematic representation of the finite state machine 2400, this state can be left by a trigger in the state change signal $V_{PWM\_BST}$. Instead, state S2 is left by a trigger from the timer, which detects that the OFF buck time $T_{OFF}$, that is, the time during which state S2 is active, reaches a predetermined value $T_{OFF\_BCK}$, as schematically indicated by the condition $T_{OFF\_BCK\_END}$ in the top portion of the FIG. 4A illustrating the finite state machine. That is, in the buck mode of FIG. 4A the timer condition happens before the trigger in the state change signal $V_{PWM\_BST}$.

The timer condition causes the finite state machine 2440 to leave state S2 and move back to state S1A, at time TAt time T a buck cycle has thus been completed and a new cycle can begin.

As is can be seen from above, the time during which the inductor 1120 is being discharged, namely $T_{OFF\_BCK}$ can be set to a predetermined value, thus avoiding issues related to a too short value as in the prior art. At the same time, the correct value of the output voltage $V_{OUT}$ can be reached by modulating the duration of state S1A.

In FIG. 4B, the operation of the boost mode is illustrated. In this mode, $V_{OUT}$ is higher than $V_{IN}$. Starting from time t=0, the finite state machine 2400 is in state S1B, so that current flows through inductor 1120 discharging it, since $V_{IN}$ is lower than $V_{OUT}$.

This leads to $V_{MOD}$ falling, until it reaches $V_{EA\_SHIFT}$ at point $t_{1B}$. At this point, comparator 2320C causes a state change of the signal $V_{PWM\_BST}$ from the first value, for instance a low value in the figure, to the second value, for instance a high value in the figure.

As noted in FIG. 4B, this happens before the OFF buck time $T_{OFF}$, that is, the time during which state S1B is active, reaches a predetermined value $T_{OFF\_MAX\_BST}$. In fact, reaching the predetermined value $T_{OFF\_MAX\_BST}$ would result in a change of state S1B to S2, as schematically indicated by the condition $T_{OFF\_MAX\_BST\_END}$ in the top portion of the FIG. 4B illustrating the finite state machine.

Since the condition $V_{MOD} \leq V_{EA\_SHIFT}$ happens before, a change in the first state change signal $V_{PWM\_BST}$ is triggered and the finite state machine 2400 moves to state S3 at time $t_{1B}$.

During state S3, the inductor 1120 is being charged so that $V_{MOD}$ increases. The signal $V_{PWM\_BST}$ therefore almost immediately changes back to a low value, as schematically indicated.

As indicated on the schematic representation of the finite state machine 2400, this state can be left by a trigger in the state change signal $V_{PWM\_BCK}$. Instead, state S3 is left by a trigger from the timer, which detects that the ON boost time $T_{ON}$, that is, the time during which state S3 is active, reaches a predetermined value $T_{ON\_BST}$, as schematically indicated by the condition $T_{ON\_BST\_END}$ in the top portion of the FIG. 4A illustrating the finite state machine. That is, in the boost mode of FIG. 4B the timer condition happens before the trigger in the state change signal $V_{PWM\_BCK}$.

The timer condition causes the finite state machine 2440 to leave state S3 and move back to state S1B, at time T. This also triggers the state change signal $V_{PWM\_BST}$ to go back to the first level. At time T a boost cycle has thus been completed and a new cycle can begin.

As it can be seen, the boost cycle is substantially symmetrical to the buck cycle, so that the same advantages can be achieved.

In FIG. 4C, the operation of the buck-boost mode is illustrated when the voltage $V_{OUT}$ is close to, but lower than, $V_{IN}$. This is schematically referred to as buck-boost mode, prevalent buck.

Starting from time t=0, the finite state machine 2400 is in state S1A, so that current flows through inductor 1120 charging it, since $V_{IN}$ is higher than $V_{OUT}$.

This leads to $V_{MOD}$ rising, until time $t_{1C}$ is reached. In this case, contrary to the buck operation illustrated in FIG. 4A, the value of $V_{MOD}$ has not yet reached $V_{EA}$, due to the slope of $V_{MOD}$ being lower than in buck mode, as a consequence of $V_{OUT}$ being higher and, in particular, being close to $V_{IN}$. Thus, in some embodiments, at this point, instead of the trigger from the comparator 2320B, in buck-boost mode, the timer 2420 is configured to trigger a change from state S1A, in which the inductor 1120 is being charged, to state S3 in which inductor 1120 is being charged at a faster rate, as a consequence of the predetermined time $T_{ON\_MAX\_BCK}$ having expired.

That is, since the ON buck time $T_{ON}$, that is, the time during which state S1A is active, reaches the predetermined value $T_{ON\_MAX\_BCK}$, the finite state machine 2400 changes state from S1A to S3, as schematically indicated by the condition $T_{ON\_MAX\_BCK\_END}$.

In state S3, the inductor is being charged at a faster rate than in state S1A, so that signal $V_{MOD}$ increases faster, as can be seen in FIG. 4O, reaching the value $V_{EA}$ at time $t_{2C}$. Switching to state S3 instead of staying in S1A avoids the frequency from becoming too slow, which could lead to a loss of stability and control, as well as an increase in ripple voltage.

At this point, the condition $V_{MOD}=V_{EA}$ is again satisfied so that a change in the first state change signal $V_{PWM\_BCK}$ is triggered and the finite state machine 2400 moves to state S2 at time $t_{2C}$.

As $V_{OUT}$ approaches $V_{IN}$ the duration of the S3 state increases above its set minimum and the ripple comes back under control.

During state S2, the inductor 1120 is being discharged so that $V_{MOD}$ decreases. Under this condition the $V_{PWM\_BCK}$ signal switches back to its low state almost immediately after entering S2. As described above, state S2 is left by a trigger from the timer, which detects that the OFF buck time $T_{OFF}$ reaches a predetermined value $T_{OFF\_BCK}$, as schematically indicated by the condition $T_{OFF\_BCK\_END}$ in the top portion of the FIG. 4O illustrating the finite state machine.

Reaching this condition causes the finite state machine 2440 to leave state S2 and move back to state S1A, at time T. At time T a buck-boost cycle has thus been completed and a new cycle can begin.

Also in this case, the time during which the inductor 1120 is being discharged, namely $T_{OFF\_BCK}$ can thus be set to a predetermined value, thereby obtaining the same advantages indicated above.

In some embodiments, the duration of state S3 can be short, particularly as the buck-boost converter 2000 operates in a buck-boost region close to the buck region. A short duration of S3 could thus lead to potentially short switching time for switches 1113 and/or 1114, which might not be possible to implement. In those cases, it is possible to implement a minimum duration of S3, in addition to the operation of comparator 2320B. For instance, the output of the comparator 2320B can be required in addition to a timer, setting a minimum time for S3, in order to switch from state S3 to S2.

This can lead to $V_{MOD}$ slightly overshooting $V_{EA}$, and thus a corresponding slight overshoot in the current ripple of the inductor. Nevertheless, this is not an issue as the finite state machine 2400 can maintain reliable control of the states. The small overshoot in current ripple can be contained by setting a minimum practical value for the duration of S3 which allows the switches to operate correctly.

In FIG. 4D, the operation of the buck-boost mode is illustrated when the voltage $V_{OUT}$ is close to, but higher than, $V_{IN}$. This is schematically referred to as buck-boost mode, prevalent boost.

Starting from time t=0, the finite state machine 2400 is in state S1B, so that current flows through inductor 1120 discharging it, since $V_{IN}$ is lower than $V_{OUT}$.

This leads to $V_{MOD}$ falling, until time $t_{1D}$ is reached. In this case, contrary to the boost operation illustrated in FIG. 4B, the value of $V_{MOD}$ has not yet reached $V_{EA\_SHIFT}$, due to the slope of $V_{MOD}$ being lower than in boost mode, as a consequence of $V_{OUT}$ being lower and, in particular, being close to $V_{IN}$. Thus, in some embodiments, at this point, instead of the trigger from the comparator 2320C, in buck-boost mode, the timer 2420 is configured to trigger a change from state S1B, in which the inductor 1120 is being discharged, to state S2 in which inductor 1120 is being discharged at a faster rate, as a consequence of the predetermined time $T_{OFF\_MAX\_BST}$ having expired.

That is, since the OFF boost time $T_{OFF}$, that is, the time during which state S1B is active, reaches the predetermined value $T_{OFF\_MAX\_BST}$, the finite state machine 2400 changes state from S1B to S2, as schematically indicated by the condition $T_{OFF\_MAX\_BST\_END}$ in the top portion of the FIG. 4D illustrating the finite state machine.

In state S2, the inductor is being discharged at a faster rate than in state S1B, so that signal $V_{MOD}$ decreases faster, as can be seen in FIG. 4D, reaching the value $V_{EA\_SHIFT}$ at time $t_{2D}$. Switching to state S2 instead of staying in S1B avoids the frequency from becoming too slow, which could lead to a loss of stability and control, as well as an increase in ripple voltage.

At this point, the condition $V_{MOD}$ $V_{EA\_SHIFT}$ is again satisfied so that a change in the state of the signal $V_{PWM\_BST}$ is triggered and the finite state machine 2400 moves to state S3 at time $t_{2D}$.

During state S3, the inductor 1120 is being charged so that $V_{MOD}$ increases. Under this condition, the signal $V_{PWM\_BST}$ switches back to its low state almost immediately after entering S3. As described above, state S3 is left by a trigger from the timer, which detects that the ON boost time $T_{ON}$ reaches a predetermined value $T_{ON\_BST}$.

Reaching this condition causes the finite state machine 2440 to leave state S3 and move back to state S1B, at time T. At time T a buck-boost cycle has thus been completed and a new cycle can begin.

Also in this case, the time during which the inductor 1120 is being charged, namely $T_{ON\_BST}$ can thus be set to a predetermined value, thereby obtaining the same advantages indicated above.

The considerations made above with respect to the possible introduction of a minimum duration for state S3 can be similarly applied to state S2 in in the buck-boost mode.

It is therefore clear from the above that the transition between buck mode and buck-boost mode, prevalent buck, can be based on the predetermined time $T_{ON\_MAX\_BCK}$ expiring, before comparator 2320B reaches a triggering condition. Similarly, the transition between boost mode and buck-boost mode, prevalent boost, can be based on the predetermined time $T_{OFF\_MAX\_BST}$ expiring, before comparator 2320O reaches a triggering condition.

In other words, at least one state, for instance S1A in buck and S1B in boost, can have an output connection based on the timer 2420 and an output connection based on the respective state change signals $V_{PWM\_BCK}$, $V_{PWM\_BST}$. Those two options allow the switching of the loop S1A-S2 to S1A-S3-S2 for buck and S1B-S3 to S1B-S2-S3 for boost.

Figure 1B:
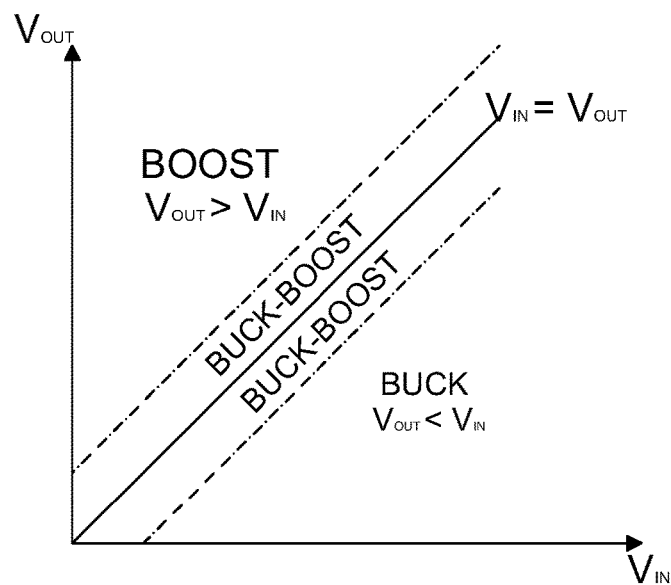
FIG. 1B schematically illustrates a graphical representation of the regions corresponding to the operation modes of the buck-boost converter 1000.

Yet in other words, the switching from buck to buck-boost prevalent buck, and similarly from boost to buck-boost prevalent boost, can be controlled by setting the respective timings $T_{ON\_MAX\_BCK}$ and $T_{OFF\_MAX\_BST}$. In this manner, the size of the buck-boost region around the condition $V_{IN}=V_{OUT}$, illustrated for instance in FIG. 1B, can be controlled.

For instance, the value of $T_{ON\_MAX\_BCK}$ timer can be set as a multiple N of $T_{OFF\_BCK}$. This is equivalent to have the transition from buck to buck-boost at a maximum duty cycle of N/(N+1) which is directly related to the input/output voltage ratio. Similarly, if $T_{OFF\_MAX\_BST}$ is set as a multiple M of $T_{ON\_BST}$, this is equivalent to set a minimum duty cycle 1/(M+1), which, in turn, is directly related to the input/output voltage ratio. This also allows flexibility, if wished, in determining different size of the region in which the buck-boost converter operates in prevalent buck and in prevalent boost mode.

Additionally, the choice of $T_{OFF\_BCK}$ and/or $T_{ON\_BST}$ can lead to a constant-ripple architecture. That is, $T_{OFF\_BCK}$ and/or $T_{ON\_BST}$ can be selected so that an inductor's current ripple in buck and in boost mode is the same. Providing a constant ripple architecture is particularly advantageous since ripple is important to determine the output capacitors and/or other filtering passive elements In particular, the ripple of the inductor's current in buck mode can be defined by the following equation:

$$\Delta I_{L_{BCK}} = \frac{V_{OUT}}{L} T_{OFF\_BCK}$$

where $\Delta I_{L_{BCK}}$ is the ripple of the inductor's current in buck mode, and L is the inductance value of the inductor 1120.

Similarly, the ripple of the inductor's current in boost mode can be defined by the following equation:

$$\Delta I_{L_{BST}} = \frac{V_{IN}}{L} T_{ON\_BST}$$

where $\Delta I_{L_{BST}}$ is the ripple of the inductor's current in boost mode, and L is the inductance value of the inductor 1120.

In some embodiments, the timers can be generated digitally, according to the formulas provided above.

Alternatively, or in addition, in some embodiments, the values of $T_{OFF\_BCK}$ and/or $T_{ON\_BST}$ can be selected as $$T_{OFF\_BCK} = \frac{V_{REF}}{V_{OUT}} \tau$$

-continued $$T_{ON\_BST} = \frac{V_{REF}}{V_{IN}} \tau$$

Where $\tau$ is defined as some internal RC time constant of a RC timer generator that ultimately can be programmed to determine the switching frequency.

In this case the constant ripple would result to be $$\Delta I_{L_{BCK}} = \Delta I_{L_{BST}} = \frac{V_{REF}}{L} \tau$$

The switch from prevalent buck mode to the prevalent boost mode can thus be achieved in step S3, by the trigger $V_{PWM\_BCK}$ being slower than the timer $T_{ON\_BST\_END}$. In this manner, the finite state machine will move to state S1B and then eventually to state S2.

From the description above it is therefore evident that no measurement of the input voltage $V_{IN}$ and of the output voltage $V_{OUT}$ is needed for achieving any of the switching of the switches 1111-1114. The problems associates with the proximity of those voltages, known from the prior art, can therefore be avoided entirely.

Moreover, the decision as to activate or not the buck-boost mode can be decided on a cycle-by-cycle basis and does not require any averaging and/or hysteresis. The error signal $V_{EA}$ acts to regulate the desired inductor current at any cycle, thus determining the triggering points so that no loss of control can happen. Advantageously, the inductor current can be bound between the equivalent values of $V_{EA}$ and $V_{EA\_SHIFT}$ points.

In particular, there might by cases in which the value of $V_{IN}$ is very close to that of $V_{OUT}$, so that the finite state machine 2400 enters into a sequence such as S2, S1A, S3, S1B, S2, etc. In particular, this is the transition condition between prevalent buck and prevalent boost.

In these transitions there is no control of either comparators 2320B, 2320C, so there is no feedback and the system may appear uncontrolled. However, even under those conditions, the inductor current is still bounded between the two limits set by $V_{EA}$ and $V_{EA\_SHIFT}$. Eventually, if there is an error in the variable under control, $V_{EA}$ will move either high or low making one of the two comparator to trip and regaining therefore control of the feedback.

In the description above, the finite state machine 2400 has been described as comprising a plurality of states S1A, S1B, S2 and S3. In order to determine what state to move to next, as illustrated in FIG. 2E, the finite state machine 2400 can comprise a state selector 2410 and the timer 2420. The state selector is generally configured to store the current state and output it to the outside of the finite state machine 2400 and to the timer 2420. The selection performed by the state selector 2410 is based on the current state and on inputs provided by the timer 2420 and the state change signals $V_{PWM\_BCK}$ and $V_{PWM\_BST}$.

The timer can be implemented in any known manner, as those skilled in the art are aware of. Preferably, timer 2420 is configured to start timing of time periods which are relevant for the currently selected case, upon receiving notification of a newly selected case. This is particularly advantageous since each state only has one time to be timed, so that the timer 2420 can start the respective measurement simply by knowing what state has been selected. For instance, upon entering state S3, the timer 2420 can start measuring time and trigger its output when the value $T_{ON\_BST}$.

Figure 5:
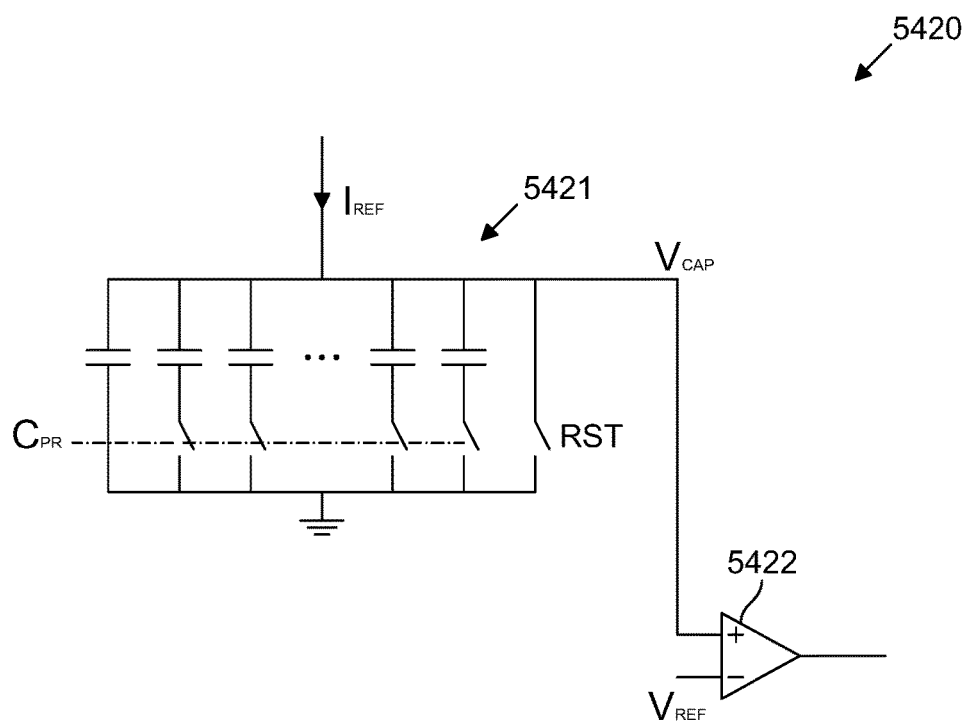
FIG. 5 schematically illustrates a possible implementation of a timer 5420.

FIG. 5 schematically illustrates a potential implementation of a RC timer 5420, which is dependent by the input voltage $V_{IN}$ or the output voltage $V_{OUT}$.

The timer 5420 comprises a variable capacitor 5421, having a capacitance value controlled by signal $C_{PR}$. A current $I_{REF}$ proportional to $V_{IN}$, for boost mode, or $V_{OUT}$, for buck mode, can be fed into capacitor $C_{PR}$. Various manners are known to those skilled in the art to generate a current which is representative of a voltage, such as using a sensing resistor and a current mirror, so that those will not be discussed in details.

The resulting voltage signal VCAP on the variable capacitor 5421 is then compared to a reference voltage $V_{REF}$ by means of a comparator 5422. As the voltage VCAP rises it reaches $V_{REF}$ and triggers a change in the output of the comparator 5422. The output of the comparator can thus be used as a timer. In order to reset the timer, a switch RST is provided, which discharges the variable capacitor 5421.

The precise point in time at which the comparator switches can be programmed by appropriately selecting the value of at least one of $I_{REF}$, $C_{PR}$ and $V_{REF}$ in manners which are known to those skilled in the art.

One advantage of this implementation is that the timings provided by the timer are a function of $V_{IN}$, for boost operation, and $V_{OUT}$, for buck operation. In particular, the time needed to charge the variable capacitor 5421 from 0 to $V_{REF}$ can be calculated as:

$$T_{ON\_BST} = RC_{PR} \frac{V_{REF}}{V_{IN}}$$

$$T_{OFF\_BCK} = RC_{PR} \frac{V_{REF}}{V_{OUT}}$$

where $(R/V_{IN})=(1/I_{REF})$ when $I_{REF}$ is generated based on $V_{IN}$ and $(R/V_{OUT})=(1/I_{REF})$ when $I_{REF}$ is generated based on $V_{OUT}$.

and where $\tau$ can be defined as $$\tau = RC_{PR}$$

Where $C_P R$ corresponds to the equivalent capacitance of the variable capacitor.

Under these conditions the current ripple on the inductor will be:

$$\Delta I_L = \Delta I_{L_{BCK}} = \Delta I_{L_{BST}} = V_{REF} \frac{RC_{PR}}{L}$$

so that it is possible to select the amount of current ripple by appropriately controlling the values of $C_{PR}$ and $V_{REF}$. Since $V_{MOD}$ is directly proportional to $\Delta I_L$, this allows the ripple on $V_{MOD}$ to be constant throughout the entire span of $V_{IN}$ and $V_{OUT}$.

Moreover, in some embodiments, the distance between $V_{EA}$ and $V_{EA\_SHIFT}$, namely the shift amount introduced by the shifter 2321, can be set to be slightly bigger than the ripple of $V_{MOD}$. This advantageously allows a smooth transition among the different working regions.

A similar configuration can be used to generate the values of $T_{ON\_MAX\_BCK}$ and $T_{OFF\_MAX\_BST}$ timers. This can be done by simply changing the value of $C_{PR}$ and setting it to a multiple N or M of the value used to generate $T_{OFF}$ and $T_{ON}$ respectively.

For a generic inductor-based dc/dc converter two different working regions can be identified depending on the applied load current, namely a continuous conduction mode, CCM, and a discontinuous conduction mode DCM.

The description of the finite state machine above assumed a CCM operation, that is, that current is either always positive or is allowed to go negative at light loads. A negative inductor current usually is not desirable because it removes energy form the load and lowers overall efficiency. For this reason, most power converters are able to detect a zero current condition and stop the inductor discharging, thus entering the DCM mode. In DCM is also desirable to lower the switching frequency since switching losses tends to be dominant, lowering the overall converter efficiency.

The buck-boost converter 2000 previously described can be, in some embodiments, further adapted so as to allow DCM operation.

Figure 6A:
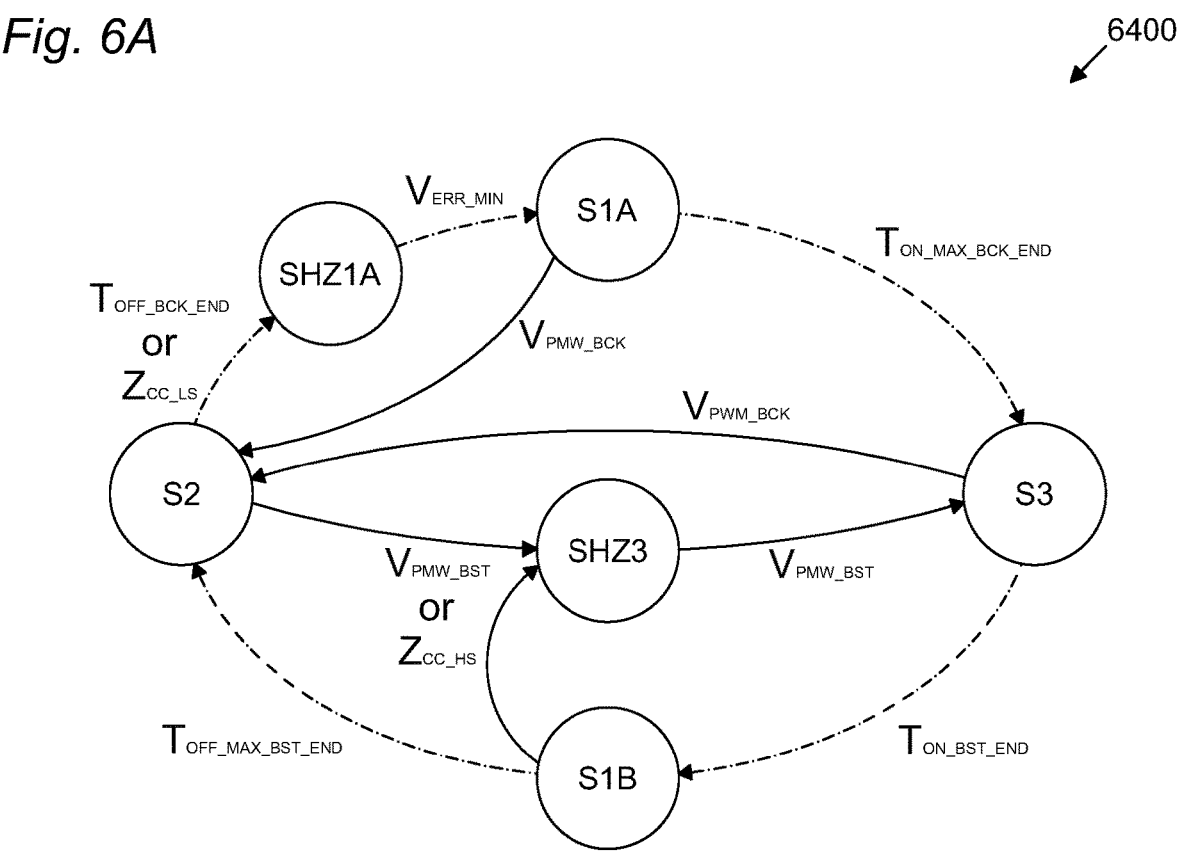
FIG. 6A schematically illustrates a possible implementation of a finite state machine 6400.

In particular, as illustrated in FIG. 6A, two additional high impedance states $S_{HZ}1$, $S_{HZ}3$ are added to the state machine 2400, resulting in state machine 6400. The two additional states can be schematically defined as follows $S_{HZ}1A$: switches 1111, 1112 and 1114 are off, switch 1113 is on $S_{HZ}3$: switches 1112, 1113 and 1114 are off, switch 1111 is on.

The switch from state S2 to $S_{HZ}1A$ can be operated when the timer $T_{OFF\_BCK\_END}$ is reached, as previously indicated. Alternatively, it can be operated when the condition $Z_{CC\_LS}$ is achieved, namely when a zero current condition in inductor 1120 is measured.

The switch from $S_{HZ}1A$ to S2 can be operated when the value of $V_{EA}$ reaches a threshold value $V_{ERR\_MIN}$.

Similarly, the switch from state S2, or S1B, to $S_{HZ}3$ can be operated based on the change of the $V_{PWM\_BST}$ signal, as previously described. Alternatively, it can be operated when the condition $Z_{CC\_HS}$ is achieved, namely when a zero current condition in inductor 1120 is measured. The switch from $S_{HZ}3$ to S3 can be operated based on the change of the $V_{PWM\_BST}$ signal, as previously described.

In particular in the illustrated full bridge configuration, two comparators, not illustrated, can be added to detect the zero-inductor current for buck, namely condition $Z_{CC\_LS}$ in state S2, and for boost, namely condition $Z_{CC\_HS}$ in state S1B. As will become clearer from the following description, when the zero current is detected, the corresponding half-bridge is set in high impedance state so to avoid a polarity change in the inductor current and to reduce power losses.

FIG. 6B-6E schematically illustrate the operation of the finite state machine 6400. Since a detailed explanation of finite state machine 2400 has already been provided, the following description will focus on the differences introduced by the two additional states $S_{HZ}1A$ and $S_{HZ}3$.

In FIG. 6B, the operation of the buck mode is illustrated. In this mode, $V_{OUT}$ is lower than $V_{IN}$. Starting from time t=0, the finite state machine 6400 is in state S1A, so that current flows through inductor 1120 charging it, since $V_{IN}$ is higher than $V_{OUT}$. The passage to state S2 is operated as previously described.

In buck mode, the converting means 1100 is then forced in high impedance condition $S_{HZ}1A$ when the zero-inductor current is detected in state S2, namely when condition $Z_{CC\_LS}$ is achieved. The state machine will change state from S2 to $S_{HZ}1A$ by turning off switch 1112.

At this point, if no other control is used, the new charge phase in state S1A could be initiated as soon as $T_{OFF}$ is expiring. In particular, in a constant $T_{OFF}$ control, the error signal $V_{EA}$ will keep decreasing to reduce the inductor charge time and $T_{ON}$ will be decreased as well. As opposed to constant $T_{ON}$ control, the frequency of the modulator will tend to increase. The two main drawbacks are that the efficiency is reduced, due to frequency increase, and that if the $T_{ON}$ period becomes too small, it becomes difficult to manage the turning ON and OFF of the switch 1111 and the regulation may be lost.

Many solutions have been implemented to avoid such a drawback in the past. Every solution provides a sort of discontinuous conduction mode detection, mainly based on zero current detection averaged over multiple periods.

Once the discontinuous conduction mode is detected, the converter will change the type of modulation going to Pulse Frequency Modulation, PFM, by lowering the switching frequency. When the current load at the output increases the converter must exit the discontinuous conduction mode, PFM mode, of regulation and go back to continuous conduction mode. Abrupt changes between the two modalities often causes noisy transients and loss of regulation.

In the proposed solution it is recognized that the error signal $V_{EA}$ sets the value of the peak current value of the inductor. In particular, in the finite state machine 6400, $V_{EA}$ can be compared to a reference voltage $V_{ERR\_MIN}$. The value of this threshold represents the minimum peak current below which the finite state machine stays in the high impedance state $S_{HZ}A1$. That is, when the error signal $V_{EA}$ is above $V_{ERR\_MIN}$ the inductor charge phase S1A restarts normally, as soon as $T_{OFF\_BCK\_END}$ expires.

On the other hand, when the error signal $V_{EA}$ is below the threshold $V_{ERR\_MIN}$, the inductor charge phase S1A is inhibited. In this case, the converting means 1100 is in the high impedance state $S_{HZ}1A$, so that no current is delivered to the output and, consequently, the error signal $V_{EA}$ starts rising until it exceeds $V_{ERR\_MIN}$, allowing then the state machine to evolve to S1A.

This control method of the discontinuous conduction mode is particularly advantageous, as it allows to determine, cycle by cycle, whether the system is in continuous conduction mode or discontinuous conduction mode, making the transition between PFM and PWM modes very smooth. At the same time, in discontinuous conduction mode, the system goes naturally in PFM mode, reducing the frequency of operation, in a manner similar as to what happens in constant $T_{ON}$ controllers In FIG. 6C, the operation of the boost mode is illustrated. In this mode, $V_{OUT}$ is higher than $V_{IN}$. Starting from time t=0, the finite state machine 6400 is in state S1B, so that current flows through inductor 1120 discharging it, since $V_{IN}$ is lower than $V_{OUT}$.

In boost mode with constant $T_{ON}$ control, the zero current detection is activated during the discharge phase, that is, in state S1B. In particular, after a zero current detection $Z_{CC\_HS}$, the inductor current discharge state S1B is stopped by opening the switch 1113. The state machine 6400 then changes from state S1B to state $S_{HZ}3$.

State $S_{HZ}3$ is a high impedance state where no current is delivered to the output. So eventually, even under a light load, the error signal $V_{EA}$ will tend naturally to increase making the $P_{WM\_BST}$ comparator to trip and causing the transition to the state S3. The working frequency will be naturally lowered as a function of the output load, and the finite state machine will automatically change from a pulse width modulation to a pulse frequency modulation, as shown in FIG. 6D.

If the output current increases again the system comes back automatically in continuous conduction mode.

In FIGS. 6D and 6E, the operation of the finite state machine 6400 in buck-boost mode, respectively in prevalent buck and in prevalent boost are schematically illustrated. The state changes will be evident to those skilled in the art based on the description above.

A critical point of an asynchronous finite state machine is how to handle bifurcation. For instance, with reference to FIGS. 4B and 4D, from state S1B the finite state machine can evolve to state S2, or S3, respectively, depending on the triggering event. In particular, in this example, if the timer $T_{ON\_MAX\_BEST\_END}$ expires before the $V_{PWM\_BOOST}$ signal triggers, then the finite state machine will move to state S2. Otherwise it will move to state S3.

For the correct operation of the buck-boost converter, the states S2 and S3 cannot be activated simultaneously, as this would cause a destructive configuration of the converting means 1100.

The difficulty in asynchronous finite state machine is how to handle triggering event that are very close in time.

Figure 7A:
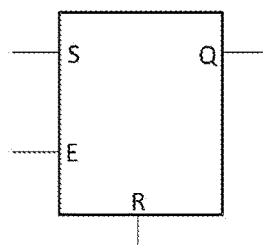
FIGS. 7A-7D relate to the structure and operation of a fork handling means 7500.

To solve this issue, in some embodiments, each state of the finite state machine can be implemented as a memory element, as schematically illustrated in FIG. 7A, with the following operation:

| E (Enable) | S (Set) | R (Reset) | Q (Output) |
|---|---|---|---|
| X | X | 1 | 0 |
| 0 | X | 0 | Q (previous value) |
| 1 | 0 | 0 | Q (previous value) |
| 1 | 1 | 0 | 1 |

That is, each state can be implemented as a reset-dominant SR Flip Flop, with an enable pin E. The set signal, which corresponds to the triggering event, is thus only effective, if the corresponding enable signal E is active. In the finite state machine implementation, the active state, and there can only be one state active at any given time, can enable the allowed next states.

In particular, in the example above with reference to the state S1B, if state S1B is active, it will enable both S2 and S3 as possible next steps. At the same time, once a state becomes active, it will force a reset the preceding states. In the example both S2 and S3 will reset S1B once either of the two becomes active.

This strategy guarantees that the reset of the state of where the branch is originated only happens when the next state, where the branch is going, is completely set thus avoiding also metastability conditions that may also cause none of the states to be active.

However, this strategy has an implicit loop delay, due to the propagation of the signal between the state of origin to the state of destination and then back to the reset of the origin. In presence of bifurcation, if the two triggering signals are close enough there might be conditions where both states of possible destination may set before the reset signal comes back to disable the state of origin.

One solution to the problem is to force the finite state machine to take a decision before propagating any branch. In most cases if the two triggering signals are so close it is irrelevant what path the finite state machine takes and the user may choose to make one path more important than the other.

Figure 7B:
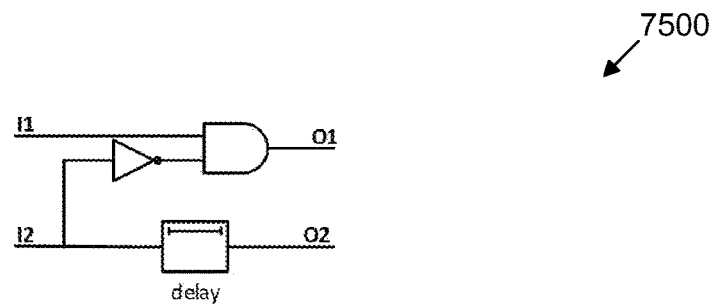

In some embodiments of the invention, the priority between the two possible paths can be solved by fork-handling means 7500, illustrated in FIG. 7B.

In particular, the fork-handling means 7500 can be provided with two input signal I1 and I2 that represent the triggering event of the two finite state machine branches from a given initial state. The fork-handling means 7500 can be further provided with two output signals O1 and O2 that are the S signal of the two possible next states. Moreover, a delay D is introduced on the event I2.

If I2 is preceding I1 it will immediately block any possible incoming I1 signal, thus forcing O1 to zero. The signal O2 will be asserted after the delay D and the finite state machine will move to the branch 2. If instead I1 is slightly ahead of I2 the operation of the fork-handling means can be better understood with reference to FIG. 7C.

Figure 7C:
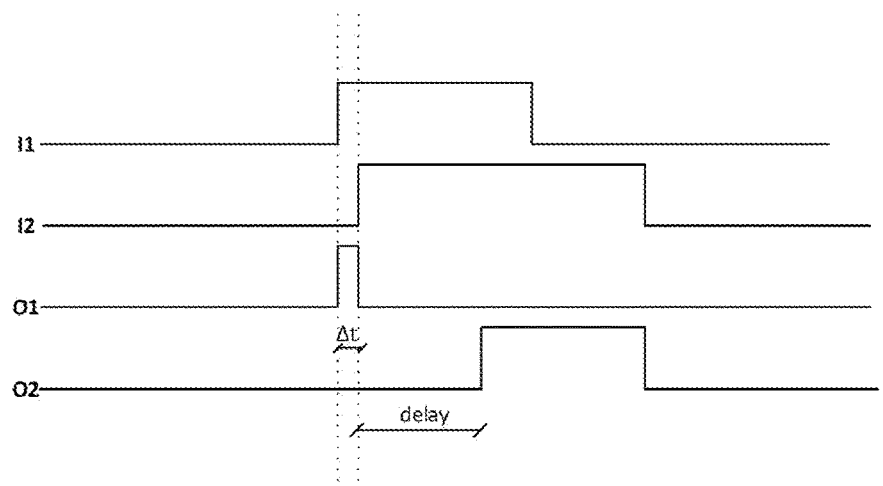

As can be seen in FIG. 7C, in case this case, the output O1 will be asserted for a time Δt that corresponds to the time skew between I1 and I2. Two cases are then possible.

1) Δt is too short to be able to set the next state on branch 1. In this case the signal I1 is ignored naturally by the SR-latch that receives it and, after delay D, the output O2 will be asserted making the finite state machine to evolve on branch 2.

2) Δt is long enough such that the signal O1 can set the following state on branch 1 and reset the state of origin. When the state of origin is reset the propagation of the signal I2 through the delay port is stopped and therefore also the branch 2 is disabled.

Bifurcation is therefore advantageously avoided if the delay D is longer than the round trip from I1 to the set of the next state and reset of the state of origin.

With this approach branch 2 becomes dominant with respect to branch 1.

Figure 7D:
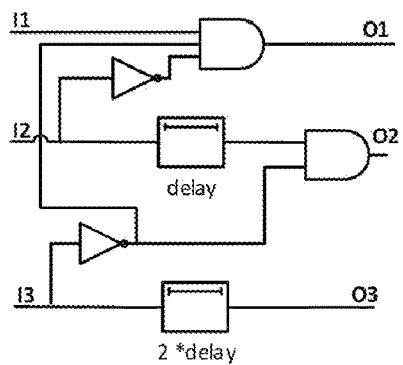

It is noted that the operation of the fork-handling means 7500 is not limited to two inputs and two output but can also be used when the possible output paths for the finite state machine state is bigger than two as schematically illustrated in FIG. 7D for a configuration with three inputs and outputs.

While several embodiments with various feature have been discussed and/or illustrated, it will be clear to those skilled in the art that the invention is not limited to those specific combinations of features. Instead, further embodiments can be obtained by combining features separately from one or more embodiments, within the scope of the claims.

LIST OF REFERENCE NUMERALS

1000: buck-boost converter
1100: converting means
1111-1114: switch
1120: inductor
1200: controller
$V_{IN}$: input voltage
$V_{OUT}$: output voltage
2000: buck-boost converter
2200: controller
2300, 2300A, 2300B, 2300D: comparing means
2310, 2310D: error amplifier
2311, 2312: resistance
2320, 2320B, 2320C: comparator
2321: signal shifter
2400: finite state machine
2410: state selector
2420: timer
$I_L$: inductor current
$V_{FB}$: sensed signal
$V_{REF}$: reference signal
$V_{EA}$: error signal
$V_{EA'}$: shifter error signal
$V_{MOD}$: replica signal
$V_{PWM\_BCK}$: first state change signal
$V_{PWM\_BST}$: second state change signal
S1A, S1B, S2, S3: state
$T_{OFF\_BCK}$, $T_{ON\_MAX\_BCK}$: predetermined time period
$T_{ON\_BST}$, $T_{OFF\_MAX\_BST}$: predetermined time period
5420: timer
5421: variable capacitor
5422: comparator
6400: finite state machine
7500: fork-handling means

The invention claimed is:

1. A buck-boost converter comprising:
   converting means for converting an input voltage into an output voltage, the converting means comprising a plurality of switches and an inductor,
   a controller for controlling the plurality of switches,
   comparing means configured to output state change signals based on a comparison of a replica signal and an error signal,
   wherein the error signal is computed on the basis of a signal representative of a difference between a characteristic of the converting means and a predetermined reference signal,
   wherein the replica signal is in a bijective correspondence with the current flowing through the inductor,
   a finite state machine configured to receive as input the state change signals and to provide as output state signals for driving the controller,
   wherein the comparing means comprises a shifter configured to change a value of the error signal by a predetermined shift amount and output a shifted error signal, and
   the comparing means and the finite state machine are configured such that application of the state change signals to the state machine results in the replica signal to be confined between the error signal and the shifted error signal.

2. The buck-boost converter according to claim 1, wherein
   wherein the characteristic of the converting means comprises any among
   the output voltage,
   the input voltage,
   an input current,
   an output current,
   an internal temperature.

3. The buck-boost converter according to claim 1, wherein
   the comparing means comprises an error amplifier configured to compare a signal sensed from the characteristic of the converting means to the predetermined reference signal, and to output an error signal based on the result of the comparison.

4. The buck-boost converter according to claim 1, wherein
   the state change signals comprise a first state change signal, and
   the comparing means comprises a comparator configured to compare the error signal to the replica signal, and to output the first state change signal based on the result of the comparison.

5. The buck-boost converter according to claim 4, wherein
the state change signals comprise a second state change signal, and
the comparing means comprise a comparator configured to compare the error signal to the replica signal, and to output the second state change signal based on the result of the comparison.

6. The buck-boost converter according to claim 1, wherein
the predetermined shift amount is at least 1%, preferably at least 2%, even more preferably at least 5%, larger than a ripple amplitude of the replica signal, and/or
the predetermined shift amount is at most 15%, preferably at most 10%, even more preferably at most 5%, larger than the ripple amplitude.

7. The buck-boost converter according to claim 1, wherein
the finite state machine comprises a timer configured to trigger at least one change in the states of the state machine upon expiry of a predetermined time duration.

8. The buck-boost converter according to claim 7, wherein
in buck mode, the timer is configured to trigger a change from a state in which the inductor is being discharged to a state in which the inductor is being charged after a predetermined first time has expired.

9. The buck-boost converter according to claim 8, wherein
in boost mode, the timer is configured to trigger a change from a state in which the inductor is being charged to a state in which the inductor is being discharged after a predetermined second time has expired.

10. The buck-boost converter according to claim 9, wherein the predetermined first time is computed as $T_{OFF\_BCK}$ and the predetermined second time is computed as $T_{ON\_BST}$ so that an inductor's current ripple in buck mode defined as $$\Delta I_{L_{BCK}} = \frac{V_{OUT}}{L} T_{OFF\_BCK}$$

and an inductor's current in boost mode defined as $$\Delta I_{L_{BST}} = \frac{V_{IN}}{L} T_{ON\_BST}$$

are equal.

11. The buck-boost converter according to claim 7, wherein the finite state machine comprises a plurality of states, and is configured to change state based on the state change signals and based on the timer.

12. The buck-boost converter according to claim 7, wherein
in buck-boost mode, the timer is configured to trigger a change from a state in which the inductor is being charged to a state in which inductor is being charged at a faster rate, after a predetermined time has expired.

13. The buck-boost converter according to claim 7, wherein
in buck-boost mode, the timer is configured to trigger a change from a state in which the inductor is being discharged to a state in which inductor is being discharged at a faster rate, after a predetermined time has expired.

14. The buck-boost converter according to claim 13, wherein the plurality of states further comprises two high impedance states.

15. The buck-boost converter according to claim 1, wherein the plurality of switches comprises
a first switch connected between the input voltage and the inductor,
a second switch connected between a mass and the inductor,
a third switch connected between the inductor and the output voltage,
a fourth switch connected between the inductor and the mass,
and wherein the finite state machine comprises
a plurality of states wherein in each state two switches are closed are two switches are open.

16. The buck-boost converter according to claim 15, wherein the plurality of states comprises
a first state, in which the first switch and the third switch are closed while the second switch and the fourth switch are open,
a second state, in which the second switch and the third switch are closed while the first switch and the fourth switch are open,
a third state, in which the first switch and the fourth switch are closed while the second switch and the third switch are open.

17. A buck-boost converter comprising:
converting means for converting an input voltage into an output voltage, the converting means comprising a plurality of switches and an inductor,
a controller for controlling the plurality of switches,
comparing means configured to output state change signals based on a comparison of a replica signal and an error signal,
wherein the error signal is computed on the basis of a signal representative of a difference between a characteristic of the converting means and a predetermined reference signal,
wherein the replica signal is in a bijective correspondence with the current flowing through the inductor,
a finite state machine configured to receive as input the state change signals and to provide as output state signals for driving the controller,
wherein the comparing means comprises a shifter configured to change a value of the replica signal by a predetermined shift amount and output a shifted replica signal,
the comparing means and the finite state machine are configured such that application of the state change signals to the state machine results in the replica signal to be confined between the error signal and a shifted error signal, and
the shifted error signal corresponds to the error signal shifted by the predetermined shift amount.

18. The buck-boost converter according to claim 17, wherein
the predetermined shift amount is at least 1%, preferably at least 2%, even more preferably at least 5%, larger than a ripple amplitude of the replica signal, and/or
the predetermined shift amount is at most 15%, preferably at most 10%, even more preferably at most 5%, larger than the ripple amplitude.

* * * * *